(12) United States Patent
Kobayashi

(10) Patent No.: US 10,432,282 B2
(45) Date of Patent: Oct. 1, 2019

(54) DEVICE AND METHOD FOR TESTING MIMO SCHEME SYSTEM

(71) Applicant: Anritsu Corporation, Kanagawa (JP)

(72) Inventor: Takeshi Kobayashi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/009,416

(22) Filed: Jun. 15, 2018

(65) Prior Publication Data

US 2019/0013849 A1   Jan. 10, 2019

(30) Foreign Application Priority Data

Jun. 20, 2017   (JP) .................. 2017-120619

(51) Int. Cl.
*H04B 7/06* (2006.01)
*H04L 27/26* (2006.01)
*H04B 17/354* (2015.01)
*H04B 17/29* (2015.01)
*H04B 17/10* (2015.01)
*H04B 17/391* (2015.01)
*H04B 7/0456* (2017.01)

(52) U.S. Cl.
CPC ......... *H04B 7/0617* (2013.01); *H04B 17/102* (2015.01); *H04B 17/29* (2015.01); *H04B 17/354* (2015.01); *H04B 17/3912* (2015.01); *H04L 27/265* (2013.01); *H04L 27/2647* (2013.01); *H04B 7/0456* (2013.01)

(58) Field of Classification Search
CPC ............. H04B 7/0617; H04B 17/3912; H04B 17/102; H04B 17/29; H04B 17/354; H04B 7/0456; H04L 27/2647; H04L 27/265

See application file for complete search history.

(56) References Cited

U.S. PATENT DOCUMENTS

2014/0126618 A1   5/2014  Kobayashi et al.
2015/0207600 A1*  7/2015  Park ........................ H04L 5/005
                                          370/329
2017/0034812 A1*  2/2017  Deng .................. H04W 72/046
(Continued)

FOREIGN PATENT DOCUMENTS

JP           2014-093758 A       5/2014

*Primary Examiner* — Kenneth T Lam
(74) *Attorney, Agent, or Firm* — Pearne & Gordon LLP

(57) ABSTRACT

The present application relates to a technique for reducing the circuit scale of a testing device having a function of performing a fading process with respect to a propagation channel of S×U channels assumed between transmitting and receiving antennas, using a terminal compatible with MIMO for transmitting a downlink signal from a base station to a mobile terminal with the number of base station-side antennas S and the number of terminal-side antennas U, or a circuit substrate, an integrated circuit and the like built into the terminal, as a test object. The multiplication arithmetic operation of the characteristics of the propagation channel and the modulation signal is performed in the frequency domain, and a time domain signal is generated from the arithmetic operation result. It's possible to considerably reduce the scale of a circuit that performs inverse Fourier transform and the scale of a circuit that generates propagation channel characteristics.

8 Claims, 8 Drawing Sheets

(56) References Cited

U.S. PATENT DOCUMENTS

2017/0331663 A1* 11/2017 Moradi .............. H04L 27/3494
2018/0175950 A1*  6/2018 Kobayashi ......... H04B 17/3911
2018/0205481 A1*  7/2018 Shlomo .............. H04L 27/2639

* cited by examiner

DEVICE AND METHOD FOR TESTING MIMO SCHEME SYSTEM

TECHNICAL FIELD

The present invention relates to a technique for reducing the circuit scale of a testing device having a function of performing a fading process with respect to a propagation channel of S×U channels assumed between transmitting and receiving antennas, using a terminal compatible with a multi input multi output (MIMO) scheme for transmitting a downlink signal from a base station to a mobile terminal with the number of base station-side antennas S and the number of terminal-side antennas U, or a circuit substrate, an integrated circuit and the like built into the terminal, as a test object.

BACKGROUND ART

As shown in FIG. 10, in a MIMO scheme, downlink signals Stx1 to StxS to the terminal side are transmitted from S (S=4 in this example) base station-side antennas (hereinafter, referred to as transmitting antennas) Atx1 to AtxS, and are received in U (U=2 in this example) terminal-side antennas (hereinafter, referred to as receiving antennas) Arx1 to ArxU.

Therefore, S×U propagation channels (channels) are assumed between each transmitting antenna and each receiving antenna, and L (for example, L=4) paths different from each other for each channel are assumed. In a case where the propagation characteristics of each channel inclusive of a path are set to H (1, 1, 1 to L) to H (S, U, 1 to L), and a mobile terminal supporting the MIMO scheme, a circuit used in the mobile terminal, or the like is tested, it is necessary to perform an arithmetic operation process in which the effects of propagation characteristics of each channel and the characteristics of a loss, a delay, a Doppler shift or the like for a path are taken into account with respect to a downlink signal, to finally generate received signals Srx1 to SrxU which are output from U receiving antennas Arx1 to ArxU, and to give the generated signals to a test object 1.

On the other hand, in recent years, as a modulation scheme, high-speed signal transmitting based on a multicarrier modulation scheme such as orthogonal frequency division multiplexing (OFDM), universal filtered multicarrier (UFMC), generalized frequency division multiplexing (GFDM), or filtered bank multi-carrier (FBMC) is realized, and a MIMO scheme system capable of higher-speed information communication is realized by a combination of this multicarrier modulation scheme and the MIMO scheme, whereby a device for testing the system is required.

In addition, in the next-generation (fifth generation) communication scheme, it is proposed to use a higher frequency band. In a case where a frequency band used in communication in this manner becomes higher, the size of each antenna can be formed to be small. Therefore, so-called beam forming becomes possible in which an array antenna structure having a large number of antenna elements arranged lengthwise and breadthwise is adopted, and radio waves are efficiently radiated in a direction in which a mobile terminal of a communication object is present, by phase control of a downlink signal given to these antenna elements. Therefore, in a testing device in which such a next-generation mobile terminal is a test object, an arithmetic operation process of beam forming for a large number of antennas arrayed is required.

FIG. 11 shows a configuration example of a testing device for testing a system in which a multicarrier modulation scheme, a MIMO scheme and a beam forming process based on an array antenna are combined.

This testing device 10 is a device supporting OFDM for performing communication with a terminal using K subcarriers as one of the multicarrier modulation schemes, and a layer frequency domain signal generation unit 11 generates and outputs modulation signals (constellation data) Ssym(1, 1) to Ssym(1, K), Ssym(2, 1) to Ssym(2, K), . . . , Ssym(R, 1) to Ssym(R, K) for each of K subcarriers with respect to R series of transmitting data (called layer or stream) to be transmitted to a test object. This modulation signal Ssym is a signal in a frequency domain including R series of data having K constellation data lined up on a frequency axis, for each OFDM symbol.

These modulation signals Ssym are input to a beam forming process unit 12, are arithmetically processed so that the beam characteristics of radio waves emitted from S transmitting antennas are set to desired characteristics, and are converted into beam forming process signals Sbf(1, 1) to Sbf(1, K), Sbf(2, 1) to Sbf(2, K), . . . , Sbf(S, 1) to Sbf(S, K) for each of K subcarriers per transmitting antenna. Meanwhile, in the following description inclusive of the drawing, a set of j signals Sx(i, 1) to Sx(i, j) may be abbreviated to Sx(i, 1 to j).

These beam forming process signals Sbf are input to S sets of time domain signal generation units 13(1) to 13(S). Each time domain signal generation unit 13(i) (i=1 to S) performs an inverse Fourier transform (IFFT) process, a cyclic prefix (CP) addition process, a band-limiting process, or the like with respect to a set of K beam forming process signals Sbf (i, 1 to K), and converts the signals into signals on a time axis specified in an OFDM scheme.

Thereby, transmitting signals (downlink signals) Stx1 to StxS given to S transmitting antennas Atx1 to AtxS are output from the respective time domain signal generation units 13(1) to 13(S).

These transmitting signals Stx1 to StxS are input to a propagation channel simulator 20 that simulates the characteristics of the propagation channel of S×U channels.

The propagation channel simulator 20 takes S×U channels formed between S transmitting antennas and U receiving antennas and L paths for each of the channels into consideration, adds a desired delay and fading to these S×U×L paths, and virtually generates signals received by the U receiving antennas.

This propagation channel simulator 20 is used in giving Rayleigh fading indicating the distribution of receiving level fluctuations in wireless communication, and includes a delay setting unit 21 that gives a predetermined delay to L paths which are set in S series of transmitting signals Stx1 to StxS to be output, a fading setting unit 22 that obtains the characteristics of a propagation channel of Rayleigh distribution to which a Doppler shift and MIMO-correlated information are given, and an arithmetic operation unit 23 that generates signals Srx1 to SrxU received in the U receiving antennas through S×M×L virtual propagation channels by a product-sum arithmetic operation (matrix multiplication) using all paths' delay process signals Stx (1, 1, 1 to U), Stx (2, 1, 1 to L), . . . , Stx (S, U, 1 to L) which are output from the delay setting unit 21 and propagation characteristics H (1, 1, 1 to L), H (2, 1, 1 to L), . . . , H (S, U, 1 to L) obtained by the fading setting unit 22.

Here, the delay setting unit 21 gives a desired delay to each path by, for example, a combination of a delay of one sample unit based on a memory and a delay of one sample or less based on a resampling filter.

In addition, the arithmetic operation process of the arithmetic operation unit 23 is, for example, as follows.

$$Srx1 = \sum H(1, 1, i) \cdot Stx(1, 1, i) +$$
$$\sum H(2, 1, i) \cdot Stx(2, 1, i) + \cdots + \sum H(S, 1, i) \cdot Stx(S, 1, i)$$
$$Srx2 = \sum H(1, 2, i) \cdot Stx(1, 2, i) + \sum H(2, 2, i) \cdot Stx(2, 2, i) + \cdots +$$
$$\sum H(S, 2, i) \cdot Stx(S, 2, i) \ldots SrxU = \sum H(1, U, i) \cdot Stx(1, U, i) +$$
$$\sum H(2, U, i) \cdot Stx(2, U, i) + \cdots + \sum H(S, U, i) \cdot Stx(S, U, i)$$

Here, the symbol $\Sigma$ indicates the sum of i=1 to L.

The received signals Srx1 to SrxU obtained in this manner are given to the test object 1, and thus it is possible to test the operation of the test object 1 for a propagation channel between the transmitting and receiving antennas which is set on the testing device side.

Meanwhile, a device for testing a system in which a propagation channel simulator is not included, but the multicarrier modulation scheme and the MIMO scheme are combined as described above is disclosed in, for example, the following Patent Document 1.

RELATED ART DOCUMENT

Patent Document

[Patent Document 1] JP-A-2014-93758

DISCLOSURE OF THE INVENTION

Problem that the Invention is to Solve

As in the testing device having the above configuration, the number of arrayed transmitting antennas S becomes as very large as, for example, 128 in a system that performs a beam forming process. Accordingly, 128 sets of time domain signal generation units 13 that perform S series of inverse Fourier transform processes in parallel are required, and thus the scale of a circuit becomes very large.

In addition, as described above, the delay setting unit 21 of the propagation channel simulator 20 requires a hardware configuration for giving an arbitrary delay by a combination of a memory and a resampling filter. Therefore, in order to give an arbitrary delay to L paths which are set in 128 series of signals as described above, the scale of a circuit also becomes very large, and the size of a device increases, which leads to an increase in manufacturing cost and power consumption.

The present invention is contrived to solve the above problem, and an object thereof is to provide a testing device and a testing method which are capable of being realized on a small circuit scale and at low power consumption even in a case where the number of transmitting antennas is large in a system in which a multicarrier modulation scheme, a MIMO scheme and a beam forming process are combined.

Means for Solving the Problem

In order to achieve the object, according to a first aspect of the present invention, there is provided a device for testing a MIMO scheme system adopting a multicarrier modulation scheme using K carriers, a MIMO scheme using S transmitting antennas and U receiving antennas, and a beam forming process scheme for setting radiation beam characteristics based on S transmitting antennas, in which receiving signal received by the U receiving antennas through a propagation environment including N scatters transmitted from the S transmitting antennas is generated and the generated receiving signal is given to a test object, the device including:

a layer frequency domain signal generation unit (31) that generates R×K series of modulation signals in a frequency domain for each of the K carriers with the input of R layers' worth of data signal sequences to be transmitted to the test object;

a first propagation channel arithmetic operation unit (41) that obtains characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a second propagation channel arithmetic operation unit (42) that obtains characteristics of a propagation channel taking account of a movement of the test object by multiplications of an arithmetic operation result of the first propagation channel arithmetic operation unit and phase characteristics for giving a Doppler frequency shift due to the movement of the receiving antenna and the test object;

a third propagation channel arithmetic operation unit (43) that obtains characteristics of a propagation channel taking account of receiving characteristics of the receiving antennas by multiplications of arithmetic operation results of the second propagation channel arithmetic operation unit and receiving antenna characteristics indicating the receiving characteristics of the receiving antenna;

a Fourier transform unit (44) that groups the rays into one unit that may be regarded as having a common Doppler frequency shift for each of the receiving antennas among arithmetic operation results of the third propagation channel arithmetic operation unit and performs Fourier transform processes on characteristics of propagation channels of L units with different Doppler frequencies to obtain characteristics of propagation channel in the frequency domain at every carrier frequency;

a propagation signal arithmetic operation unit (51) that generates U×L series of propagation signals per carrier in the frequency domain via a pseudo propagation channel from the plurality of transmitting antennas to the plurality of receiving antennas by multiplications of the arithmetic operation result of the Fourier transform unit and the modulation signal of the R×K series generated by the layer frequency domain signal generation unit;

a window function arithmetic operation unit (52) that, as a process in the frequency domain corresponding to the signal extraction by multiplications of a window function rotating at a Doppler frequency corresponding to each series, performs an extraction process of propagation signals of U×L series per carrier, by performing a convolution arithmetic operation of the frequency characteristic of the window function with the propagation signal of the U×L series per carrier obtained by the propagation signal arithmetic operation unit;

a path signal addition unit (53) that generates U series propagation signals per carrier by performing an addition process of L units of signals for each of the receiving antennas for the arithmetic operation results of the window function arithmetic operation unit;

a time domain signal generation unit (54) that generates signals in the time domain to be received by the receiving antennas by performing inverse Fourier transform processes with the input of the arithmetic operation results of the path signal addition unit; and a shift addition unit (55) that generates consecutive signals to be received by the receiving antennas by shifting as much as a length of the window function and adding the signals in the time domain generated by the time domain signal generation unit According to a second aspect of the present invention, there is provided a device for testing a MIMO scheme system adopting a multicarrier modulation scheme using K carriers, a MIMO scheme using S transmitting antennas and U receiving antennas, and a beam forming process scheme for setting radiation beam characteristics based on the S transmitting antennas, in which assumption of a pseudo propagation channel that spans the range from the S transmitting antennas to the U test object receiving antennas through a propagation environment including N scatters is made, and generating incident waves to be fed into the U receiving antennas through the propagation channel and giving the incident waves to the test object through U' probe antennas in an anechoic chamber, the device including:

a layer frequency domain signal generation unit (31) that generates R×K series' worth of modulation signals in the frequency domain for each of the K carriers with the input of R layers' worth of data signal sequences to be transmitted to the test object;

a first propagation channel arithmetic operation unit (41) that obtains characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a second propagation channel arithmetic operation unit (42) that obtains characteristics of a propagation channel taking account of a movement of the test object by multiplications of an arithmetic operation result of the first propagation channel arithmetic operation unit and phase characteristics for giving a Doppler frequency shift due to the movement of the test object;

a Fourier transform unit (44') that groups the rays into one unit that may be regarded as having the same arrival direction of radio waves viewed from the test object among the arithmetic operation results of the second propagation channel arithmetic operation unit and performs Fourier transform processes on characteristics of propagation channels of L units with different arrival directions to obtain characteristics of propagation channel in the frequency domain at every carrier frequency;

a propagation signal arithmetic operation unit (51') that generates L series of propagation signals per carrier in the frequency domain via a pseudo propagation channel from the plurality of transmitting antennas to incident channels of the plurality of receiving antennas of the test object by multiplications of the arithmetic operation result of the Fourier transform unit and the modulation signal of the R×K series generated by the layer frequency domain signal generation unit;

a window function arithmetic operation unit (52') that, as a process in the frequency domain corresponding to the signal extraction by multiplications of a window function rotating at a Doppler frequency corresponding to each series, performs an extraction process of L series of propagation signals per carrier, by performing a convolution arithmetic operation of the frequency characteristic of the window function to the propagation signal of the L series per carrier obtained by the propagation signal arithmetic operation unit;

a weighting arithmetic operation unit (53') that generates U' series of propagation signals per carrier by a weighting and combining process of signals of L units for each of the probe antennas with the input of the arithmetic operation results of the window function arithmetic operation unit;

a time domain signal generation unit (54') that generates signals in the time domain for outputting from the probe antennas by performing inverse Fourier transform processes with the input of the arithmetic operation results of the weighting arithmetic operation unit; and a shift addition unit (55') that generates consecutive incident waves to be output from the probe antennas and to be radiated on the test object by shifting as much as a length of the window function and adding the signals in the time domain generated by the time domain signal generation unit.

In addition, according to the device for testing a MIMO scheme system according to a third aspect of the present invention, in the device for testing a MIMO scheme system of the first aspect, the Fourier transform unit includes a Fourier transform arithmetic operation unit (44a) that performs Fourier transform arithmetic operation processes with the input of the L unit' worth of the propagation channel characteristics, and an interpolation unit that (44c) performs interpolation processes in the frequency axis with the input of arithmetic operation results of the Fourier transform arithmetic operation unit.

In addition, according to the device for testing a MIMO scheme system according to a fourth aspect of the present invention, in the device for testing a MIMO scheme system of the second aspect, the Fourier transform unit includes a Fourier transform arithmetic operation unit (44a) that performs Fourier transform arithmetic operation processes with the input of the L unit' worth of the propagation channel characteristics, and an interpolation unit that (44c) performs interpolation processes in the frequency axis with the input of arithmetic operation results of the Fourier transform arithmetic operation unit.

In addition, according to a fifth aspect of the present invention, there is provided a method for testing a MIMO scheme system, in a system adopting a multicarrier modulation scheme using K carriers, a MIMO scheme using S transmitting antennas and U receiving antennas, and a beam forming process scheme for setting radiation beam characteristics based on S transmitting antennas, in which assumption of a pseudo propagation channel that spans the range from S transmitting antennas to U receiving antennas of the test object through a propagation environment including N scatters is made, and generating receiving signals to be received through the U receiving antennas through the propagation channel and giving the receiving signals to the test object, the method including:

a step of generating R×K series of modulation signals in the frequency domain for each of the K carriers with the input of R layers' worth of data signal sequences to be transmitted to the test object;

a step of obtaining characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a step of obtaining characteristics of a propagation channel taking account of a movement of the test object by multiplications of the characteristics of the propagation channel taking account of beam forming characteristics and phase characteristics for giving the test object and a Doppler frequency shift due to the movement of the receiving antenna and the test object;

a step of obtaining characteristics of a propagation channel taking account of receiving characteristics of the receiving antennas by multiplications of the characteristics of the propagation channel taking account of the movement of the test object and the receiving antenna characteristics indicating the receiving characteristics of the receiving antennas;

a step of grouping the rays into one unit that may be regarded as having a common Doppler frequency shift for each of the receiving antennas among arithmetic operation results of the characteristics of the propagation channel taking account of receiving characteristics of the receiving antennas and performing Fourier transform processes on characteristics of propagation channels of L units with different Doppler frequencies to obtain characteristics of propagation channel in the frequency domain at every carrier frequency;

a step of generating U×L series of propagation signals per carrier in the frequency domain passing through a pseudo propagation channel from the transmitting antennas to the receiving antennas by multiplications of the characteristics of the propagation channel in the frequency domain at every carrier frequency and a generated R×K' series worth of modulated signals;

a step of generating an extraction process of U×L series of propagation signals per carrier by performing a convolution arithmetic operation of the frequency characteristic of the window function with the propagation signal of the U×L series per carrier generated in the frequency domain, as a process in the frequency domain corresponding to the signal extraction obtained by multiplications of a window function rotating at a Doppler frequency corresponding to each series;

a step of generating U series of propagation signals per carrier by performing an addition process of L units of signals for each of the receiving antennas with the input of U×L series of the propagation signal per carrier extracted by the convolution arithmetic operation of the frequency characteristics of the window function;

a step of generating signals in the time domain to be received by the receiving antennas by performing an inverse Fourier transform processes with the input of the U series of the propagation signal per carrier generated by the addition process; and a step of generating consecutive signals to be received by the receiving antennas by shifting as much as a length of the window function and adding the signals generated in the time domain.

According to a sixth aspect of the present invention, there is provided a method for testing a MIMO scheme system, in a system adopting a multicarrier modulation scheme using K carriers, a MIMO scheme using S transmitting antennas and U receiving antennas, and a beam forming process scheme for setting radiation beam characteristics based on the S transmitting antennas, in which assumption of a pseudo propagation channel that spans the range from S transmitting antennas to the U test object receiving antennas through a propagation environment including N scatters is made, and generating incident waves to be fed into the U receiving antennas through the propagation channel and giving the incident waves to the test object through U' probe antennas in an anechoic chamber, the method including:

a step of generating R×K series of modulation signals in the frequency domain for each of the K carriers with the input of R layers' worth of data signal sequences to be transmitted to the test object;

a step of obtaining characteristics of a propagation channel taking account of beam forming characteristics, by multiplications of S×R series of beam forming characteristics, whose size is specified by the number of the transmitting antennas and the number of layers, and characteristics simulating a propagation channel through which a signal transmitted from the transmitting antenna is output as M rays per scatter according to the characteristics of the transmitting antenna and arrives at the corresponding scatter;

a step of obtaining characteristics of a propagation channel taking account of a movement of the test object by multiplications of the characteristics of the propagation channel taking account of beam forming characteristics and phase characteristics for giving a Doppler frequency shift due to the movement of the test object;

a step of grouping the rays into one unit that may be regarded as having the same arrival direction of radio waves viewed from the test object among the characteristics of the propagation channel taking account of a movement of the test object and performing Fourier transform processes on characteristics of propagation channels of L units with different arrival directions to obtain characteristics of propagation channel in the frequency domain at every carrier frequency;

a step of generating L series of propagation signals per carrier in the frequency domain via a pseudo propagation channel from the plurality of transmitting antennas to incident channels of the plurality of receiving antennas of the test object by multiplications of the characteristics of the propagation channel in the frequency domain at every carrier frequency and the generated R×K series modulation signals;

a step of performing an extraction process of L series of propagation signals per carrier by performing a convolution arithmetic operation of the frequency characteristic of the window function with the propagation signal of the L series per carrier, as a process in the frequency domain corresponding to the signal extraction by multiplications of a window function rotating at a Doppler frequency corresponding to each series;

a step of generating U' series of propagation signals per carrier by weighting and combining process of signals of L units for each of the probe antennas with the input of the propagation signals extracted by the convolution arithmetic operation of the frequency characteristics of the window function;

a step of generating signals in the time domain for outputting from the probe antennas by performing inverse Fourier transform processes with the input of the arithmetic operation results of the weighting process; and a step of generating consecutive incident waves to be output from the probe antennas and to be radiated on the test object by shifting as much as a length of the window function and adding the generated signals in the time domain.

In addition, according to the method for testing a MIMO scheme according to a seventh aspect of the present invention, in the method for testing a MIMO scheme of the fifth aspect, the step of obtaining the characteristics of the propagation channel in the frequency domain at every carrier frequency includes a step of performing Fourier transform arithmetic operation processes with the input of the L unit' worth of the propagation channel characteristics, and a step of performing interpolation processes in the frequency axis with the input of arithmetic operation results of the Fourier transform arithmetic operation process.

In addition, according to the method for testing a MIMO scheme according to an eighth aspect of the present invention, in the method for testing a MIMO scheme of the sixth aspect, the step of obtaining the characteristics of the propagation channel in the frequency domain at every carrier frequency includes a step of performing Fourier transform arithmetic operation processes with the input of the L unit' worth of the propagation channel characteristics, and a step of performing interpolation processes in the frequency axis with the input of arithmetic operation results of the Fourier transform arithmetic operation process.

Advantage of the Invention

In the first aspect and the fifth aspect of the present invention, a modulation signal for each carrier is generated with the input of a data signal sequence of R layer, a characteristic of a receiving antenna and a characteristic of a Doppler frequency shift associated with a movement of a test object is added to a characteristic of a propagation channel including a scatter determined by a beam forming characteristic and a transmitting antenna characteristic, the characteristics of the propagation channel from the transmitting antennas to the receiving antennas are obtained, the obtained characteristics are group as a propagation channel regarded as having the common Doppler frequency shift and fading characteristics associated with layer dispersion is given, and the characteristics of the propagation channel in a frequency domain for each carrier interval by a Fourier conversion process. The propagation signal in the frequency domain to which the desired propagation channel characteristics and the beam forming characteristics are given is generated for each propagation channel regarded as having the common Doppler frequency shift by the multiplication of the characteristics of the propagation channel and the modulation signal for each carrier, as a process in the frequency domain corresponding to the signal extraction by multiplications of a window function in the time domain rotating at a Doppler frequency corresponding to each series with the input of the propagation signal, a convolution arithmetic operation on the frequency characteristic of the window function is performed, series having the different frequencies are added for each of the receiving antennas to generate signals in the time domain by inverse Fourier transform process on the added series, and the generated signal is shifted and added by the length of the window function, to thereby generate consecutive to be received signals received in each receiving antenna.

In addition, in the second aspect and the sixth aspect of the invention, a modulation signal for each carrier is generated with the input of a data signal sequence of R layer, a characteristic of a receiving antenna and a characteristic of a Doppler frequency shift associated with a movement of a test object is added to a characteristic of a propagation channel including a scatter determined by a beam forming characteristic and a transmitting antenna characteristic, the characteristics of the propagation channel from the transmitting antennas to the scatter (cluster) are obtained, the obtained characteristics are grouped as a propagation channel regarded as having the same arrival direction and fading characteristics associated with a Rayleigh distribution is given, and the characteristics of the propagation channel in a frequency domain for each propagation channel regarded as having the same arrival direction are obtained by a Fourier transform process. The propagation signal in the frequency domain to which the desired propagation channel characteristics and the beam forming characteristics are given is generated for each propagation channel regarded as having the same arrival direction by the multiplication of the characteristics of the propagation channel and the modulation signal for each carrier, as a process in the frequency domain corresponding to the signal extraction by multiplications of a window function in the time domain rotating at a Doppler frequency corresponding to each series with the input of the propagation signal, a convolution arithmetic operation on the frequency characteristic of the window function is performed, series having the different frequencies are added for the receiving antennas to generate signals in the time domain by inverse Fourier transform process on the added series, and consecutive incident waves for entering the U receiving antennas through the propagation channel to give the incident wave to the test object through probe antennas to inside an anechoic chamber by shifting and adding a length of the window function on the generated signals.

In this manner, in the example of the present invention, the multiplication arithmetic operation of the characteristics of the propagation channel and the modulation signal is performed in the frequency domain, and a time domain signal is generated from the arithmetic operation result. Therefore, it is possible to considerably reduce the scale of a circuit that performs inverse Fourier transform and the scale of a circuit that generates propagation channel characteristics, as compared with a case where inverse Fourier transform is applied to a signal in the frequency domain for each transmitting antenna to convert the signal into a signal in the time domain and then the propagation channel characteristics are given, as in a scheme of related art.

In particular, in the arithmetic operation for obtaining the characteristics of the propagation channels, since the arithmetic operation of the transmitting antenna characteristics taking account of the beam forming characteristics and the scatter is preferentially performed, in subsequent processes of the Doppler frequency shift in the arithmetic operation and of the arithmetic operation of receiving antenna characteristics, the arithmetic operation dependent on the number of transmitting antennas is eliminated. Therefore, as proposed by the next generation (fifth generation) communication method, in a case where a base station side (transmitting side) tests a system using a large number of antenna elements such as array antennas, a scale of the subsequent arithmetic operations can be remarkably reduced, and it is extremely effective.

However, in the example of the present invention, a Fourier transform process for converting the propagation channel characteristics of paths regarded as having the common Doppler frequency shift (arrival direction) into the frequency domain is required in consideration of the scatter, but in this Fourier transform process, the amount of delay of each path in the time domain corresponds to the rotational speed of a frequency component of each path in the frequency domain. Therefore, hardware in which a delay is given to each path by a combination of a memory and a resampling filter performed in the time domain of related art is replaced by a rotation process in Fourier transform, and the example of the present embodiment is considerably advantageous when both the scales of hardware are compared with each other.

In addition, in the third aspect, the fourth aspect, the seventh aspect and the eighth aspect of the present invention, since the two-stage process of Fourier transform arithmetic operation process on the characteristics of L unit's worth of the propagation channel and an interpolation process in the frequency axis direction with the input of the arithmetic operation result is used as a configuration for obtaining the characteristics of the propagation channel in the frequency domain for each carrier interval by Fourier transform, a sampling interval in the frequency domain of the Fourier transform is set to the minimum necessary interval determined by the maximum delay amount of the propagation channel characteristic in the time domain and then it is possible to adopt a two-stage pipeline process for interpolating the propagation channel characteristics in the frequency domain, and the time taken for each process is extended, and by using the common circuit resource a plurality of times, it is possible to reduce the circuit scale in the Fourier transform.

In addition, while suppressing the circuit scale, the process result of the propagation channel simulator which processes in the time domain related art can be reproduced with high accuracy.

That is, the propagation channel characteristics at relatively coarse time intervals, such as IFFT process intervals, are calculated in the time domain and Fourier transformed to obtain the frequency characteristics of the propagation channel for each IFFT time interval. By only multiplying the data by the characteristic, the propagation channel characteristics in the IFFT time interval are approximated with a constant value. However, in the present invention, since the frequency shift corresponding to the Doppler shift is given in the frequency domain to the data for each channel regarded as having common the Doppler frequency shift (or arrival direction), It is possible to make the propagation channel characteristics in the IFFT time interval change with time. The accuracy of the reproducibility compared to the propagation channel simulator that processes in the time domain in the related art can be adjusted according to the degree of approximation regarded as having the common Doppler frequency shift (or arrival direction).

BEST MODE FOR CARRYING OUT THE INVENTION

Hereinafter, embodiments of the present invention will be described with reference to the accompanying drawings, but the principle of a testing device of the present invention will be described before the specific configuration thereof is described.

The present invention can be applied as a propagation channel simulator in a case where S×U MIMO (S>U) is performed in the multicarrier modulation scheme such as OFDM, UFMC, GFDM, or FBMC stated above, and is particularly effective in a case where the number of transmitting antennas is very larger than the number of receiving antennas as in 3D-MIMO/Massive-MIMO. Hereinafter, the modulation scheme will be mainly described with the OFDM in mind.

In the present invention, as shown in the following Expression (1), by assuming that a difference $\Delta f_d$ of the Doppler frequencies at which the difference is negligible among a time spans Tc as being the same, MIMO propagation channel process is performed in the frequency domain.

$$Tc \ll 1/\Delta f_d \quad (1)$$

Where, $\Delta f_d$ is the difference between the upper limit and the lower limit of the Doppler frequency that can be regarded as the same.

For example, in a case of OFDM, as shown in the following Expression (2), the length Tc obtained by P-dividing one OFDM symbol length Tsym (=effective data length+cyclic prefix length) satisfies Expression (1) (P-division may not necessarily equal division).

$$Tc = Tsym/P (P=1,2,3,\ldots) \quad (2)$$

Figure 1:
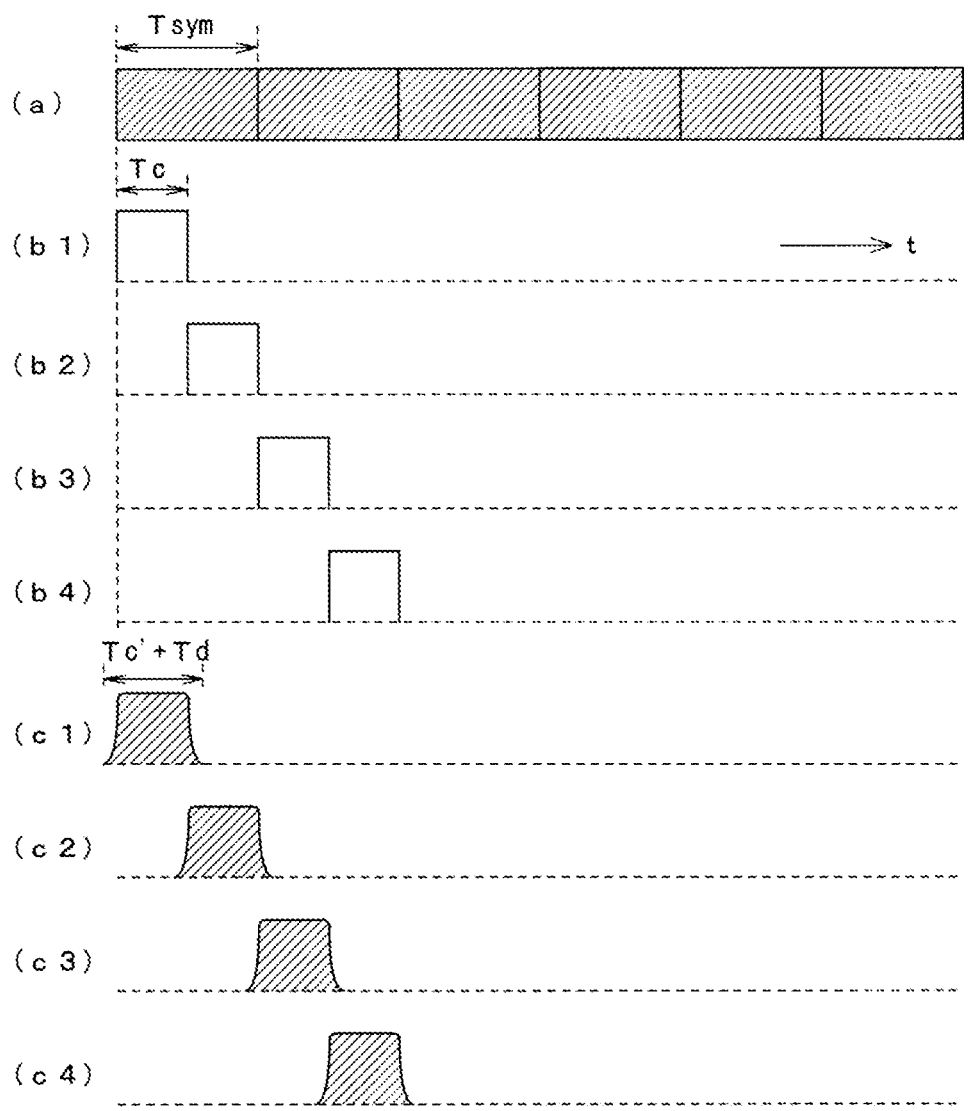
FIG. 1 is a timing diagram illustrating the principle of the present invention.

FIG. 1 shows an example of P=2 in the time domain, a waveform having a multipath propagation process, a filtering process or the like performed on a waveform obtained by multiplications of and cutting off a rectangular window function through two-division of one symbol length Tsym by Tc=Tsym/2, as shown in (b1) to (b4) of FIG. 1, with respect to a signal sequence of OFDM shown in (a) of FIG. 1 is obtained in a state of being shifted by Tc as shown in (c1) to (c4) of FIG. 1, and a final transmitting signal is obtained by performing an addition process.

The length Tc' of a window function for localization (signal excision) used in reality may be made slightly larger than Tc by rounding ends in order to suppress the extent of corresponding frequency characteristics, and multipath propagation channel process of a MIMO channel, a filtering process or the like is performed on each waveform multiplied while the timing of this window function is sequentially shifted by Tc. In addition, the time length of every single divided waveform becomes longer than Tc' by the amount of multipath delay time and by Td of the amount of extent due to a filtering process. A waveform added while shifting these lengths by Tc is considered to be a process result. The waveform of a process result is calculated by U systems in a case of S×U MIMO propagation channels.

Figure 2:
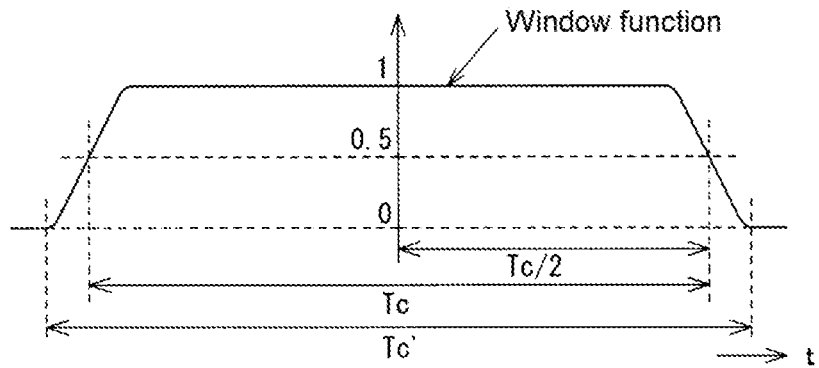
FIG. 2 is a diagram illustrating an example of a window function in the time domain.

FIG. 2 shows the details of a window function for localization (section length: Tc'), and can be, for example, a diagram used in a case where one OFDM symbol is divided into a plurality of parts, or the like. The diagram has characteristics satisfying a Nyquist criterion, and has characteristics that intervals obtained by shifting this window function by Tc are continuous with each other. As the roll-off of the window function in this time domain becomes larger, extent in the frequency domain is further suppressed, and it is possible to suppress the number of taps of a filter in a window function arithmetic operation unit 52 described later.

Figure 3:
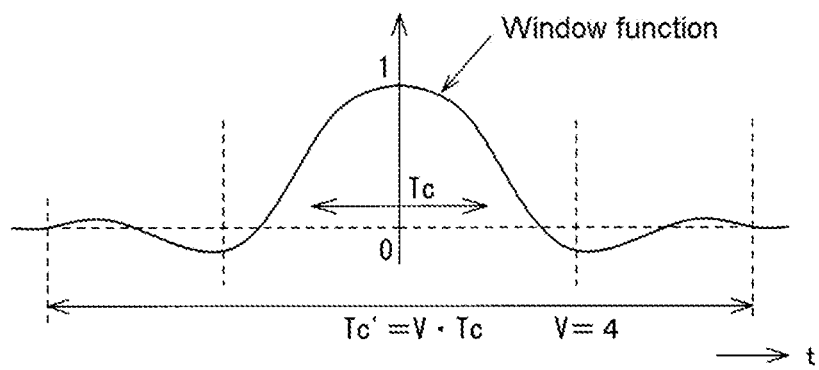
FIG. 3 is a diagram illustrating another example of the window function in the time domain.

In addition, in the time length (V·Tc) (V is the overlapping factor) of the window function as shown in FIG. 3 where the modulation scheme is the FBMC and one symbol information is spread, the present invention can be applied by process the Doppler frequency shift portions of the path in the range in which the Doppler frequency difference is sufficiently small to be the same.

Figure 4:
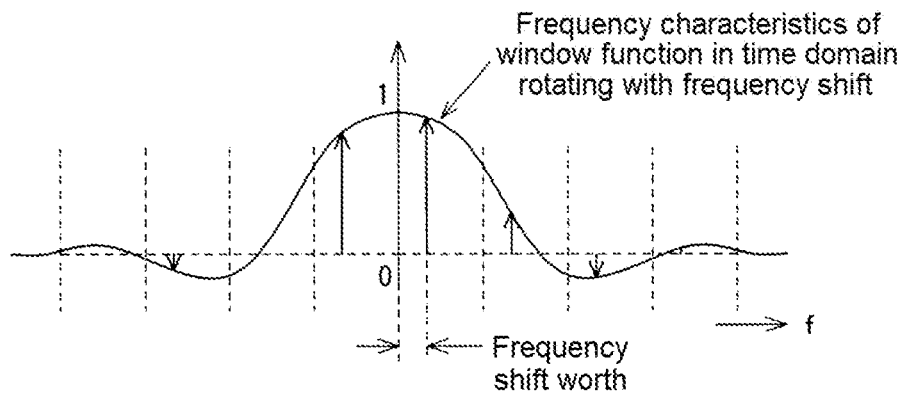
FIG. 4 is a diagram illustrating an example of frequency characteristics of the window function in the time domain rotating with a frequency shift in a case of giving a Doppler frequency shift.

In a case where the Doppler frequency shift is given to the modulation signal by the window function arithmetic operation, by convolving a function obtained by shifting the sample position of the frequency characteristic of the window function for the length (or, the length obtained by dividing) of CP+effective data in the frequency direction, it is possible to realize a Doppler frequency shift on the modulation signal (FIG. 4 illustrates a frequency characteristic of the window function, and is a diagram in which the sample position on the frequency axis is shifted by the Doppler frequency shift).

Although the above process is assumed on the time axis, in the present invention, in addition to execution of the equivalent process in the frequency domain other than the last addition process, the beamforming process which is conventionally performed on the layer signal by performing equivalent process on the characteristics of the propagation channel, the circuit scale of the entire test device is reduced.

Next, an arithmetic operation process to be performed by the test device of the present invention will be described.

Technical Report 3 GPP TR 38.900 includes U receiving antenna number u in U antennas, transmitting antenna number s in S, cluster (scatterer) number n among N used in the fifth generation system simulation, The non-line-of-sight wave propagation coefficient HNLOS of the propagation channel model (cluster model) with the number m of ray (referred to as Ray) scattered in each cluster is defined by the following Expression (5) below.

$$H_{u,s,n}^{M,OS}(t) = \sqrt{\frac{P_n}{M}} \sum_{m=1}^{M} \begin{bmatrix} F_{rx,u,\theta}(\theta_{n,m,ZOA}, \phi_{n,m,AOA}) \\ F_{rx,u,\phi}(\theta_{n,m,ZOA}, \phi_{n,m,AOA}) \end{bmatrix}^T \begin{bmatrix} \exp(j\Phi_{n,m}^{\theta\theta}) & \sqrt{k_{n,m}^{-1}} \exp(j\Phi_{n,m}^{\theta\phi}) \\ \sqrt{k_{n,m}^{-1}} \exp(j\Phi_{n,m}^{\phi\theta}) & \exp(j\Phi_{n,m}^{\phi\phi}) \end{bmatrix} \quad (5)$$

$$\begin{bmatrix} F_{tx,s,\theta}(\theta_{n,m,ZOD}, \phi_{n,m,AOD}) \\ F_{tx,u,\phi}(\theta_{n,m,ZOD}, \phi_{n,m,AOD}) \end{bmatrix} \exp\left(\frac{j2\pi(\hat{r}_{rx,n,m}^T \cdot \bar{d}_{tx,u})}{\lambda_0}\right)$$

$$\exp\left(\frac{j2\pi(\hat{r}_{rx,n,m}^T \cdot \bar{d}_{tx,u})}{\lambda_0}\right) \exp\left(\frac{j2\pi(\hat{r}_{rx,n,m}^T \cdot \bar{v})t}{\lambda_0}\right)$$

In the above Expression (5), Pn is the power of the radio wave emitted from the n-th cluster, $F_{rx, u, \theta}$ ( . . . ) and $F_{rx, u, \phi}$ ( . . . ) are characteristics for the vertical polarization component and the horizontal polarization component of the receiving antenna, exp (j$\Phi^{\theta\theta}$), exp (j$\Phi^{\phi\phi}$) are the phase coefficients of the components in which polarization does not change, exp (j$\Phi^{\theta\phi}$) and exp (j$\Phi^{\phi\theta}$) are the phase coefficients of the components in which polarization changes, and $\sqrt{k^{-1}}$ indicates the ratio thereof. In addition, $F_{tx, u, \theta}$ ( . . . ) and $F_{tx, u, \phi}$ ( . . . ) are characteristics for the vertically polarized wave component and the horizontally polarized wave component of the transmitting antenna, exp{j2π($r^T_{rx, n, m} \cdot d_{rx, u}$)/$\lambda_0$} and exp{j2π($r^T_{tx, n, m} \cdot d_{tx, s}$)/$\lambda_0$} indicates the positional shift depending on the positions of the receiving antenna and the transmitting antenna, and exp{j2π($r^T_{rx, n, m} \cdot v$)t/$\lambda_0$} indicates the frequency deviation due to the Doppler effect.

In the above expression, $r^T_{rx, n, m}$ with the symbol ^ attached above indicates a unit vector in the arrival direction of the m-th ray scattered at the n-th cluster on the receiver side to the receiving antenna, $r^T_{tx, n, m}$ with the symbol ^ attached above indicates a unit vector in the arrival direction of the m-th ray scattered at the n-th cluster on the transmitter side, $d_{rx, u}$ with the symbol—u indicates the position vector of the receiving antenna element u, $d_{tx, s}$ with the symbol— attached above, indicates the position vector of the transmitting antenna element s, and v with the symbol—indicates a velocity vector.

Here, the elements constituting the above Expression (6) are defined as follows.

(a) The element $f_{tx, s, n, m}$, which combines the transmitting antenna characteristics and the phase rotation by the propagation channel of the m-th ray radiated from the transmitting antenna and scattered at the n-th cluster is defined as follows.

$$f_{tx,s,n,m} \equiv \begin{bmatrix} F_{tx,s,\theta}(\theta_{n,m,ZOD}, \phi_{n,m,AOD}) \\ F_{tx,u,\phi}(\theta_{n,m,ZOD}, \phi_{n,m,AOD}) \end{bmatrix} \exp\left(\frac{j2\pi(\hat{r}_{tx,n,m}^T \cdot \bar{d}_{tx,u})}{\lambda_0}\right) \quad (6)$$

(b) An element $H_{n, m}$ combining the phase of the m-th ray scattered in the n-th cluster and the Doppler frequency shift given to the ray is defined as follows.

$$H_{n,m} \equiv \begin{bmatrix} \exp(j\Phi_{n,m}^{\theta\theta}) & \sqrt{k_{n,m}^{-1}} \exp(j\Phi_{n,m}^{\theta\phi}) \\ \sqrt{k_{n,m}^{-1}} \exp(j\Phi_{n,m}^{\phi\theta}) & \exp(j\Phi_{n,m}^{\phi\phi}) \end{bmatrix} \exp\left(\frac{j2\pi(\hat{r}_{rx,n,m}^T \cdot \bar{v})t}{\lambda_0}\right) \quad (7)$$

(c) An element $f_{rx, u, n, m}$ combining the receiving antenna characteristics and the phase rotation until the m-th ray scattered in the n-th cluster is received by the receiving antenna as follows.

$$f_{rx,u,n,m} \equiv \begin{bmatrix} F_{rx,u,\theta}(\theta_{n,m,ZOA}, \phi_{n,m,AOA}) \\ F_{rx,u,\phi}(\theta_{n,m,ZOA}, \phi_{n,m,AOA}) \end{bmatrix}^T \exp\left( \frac{j2\pi(\hat{r}_{rx,n,m}^T \cdot \bar{d}_{rx,u})}{\lambda_0} \right) \quad (8)$$

Furthermore, it is defined as follows.

$$\xi_{tx,s,n} \equiv \begin{bmatrix} f_{tx,s,n,1} \\ f_{tx,s,n,2} \\ \vdots \\ f_{tx,s,n,M} \end{bmatrix} \quad (9)$$

$$\Psi_n \equiv \begin{bmatrix} H_{n,1} & 0 & 0 & \cdots & 0 \\ 0 & H_{n,2} & 0 & \cdots & 0 \\ \vdots & \vdots & \ddots & \ddots & \vdots \\ 0 & 0 & 0 & \cdots & H_{n,M} \end{bmatrix} \quad (10)$$

$$\Xi_{rx,u,n} \equiv \begin{bmatrix} f_{rx,u,n,1} & 0 & 0 & \cdots & 0 \\ 0 & f_{rx,u,n,2} & 0 & \cdots & 0 \\ \vdots & \vdots & \ddots & \ddots & \vdots \\ 0 & 0 & 0 & \cdots & f_{rx,u,n,M} \end{bmatrix} \quad (11)$$

Where, since in frx, s, n, m of M matrix elements arranged in the vertical direction of $\xi$tx, s, n, the matrices in which two terms of polarized waves (horizontally polarized waves and vertically polarized waves) are arranged in the vertical direction are included as in Expression (7), $\xi$tx, s, n as a whole is a 2M×1 matrix. In addition, since in Hn, m of the diagonal matrix element of $\Psi$n, the matrices in which two terms of polarized waves are arranged in the vertical direction are included as in Expression (6), $\Psi$n as a whole is a 2M×2M matrix. In addition, in $f_{rx, u, n, m}$ of the diagonal matrix element of $\Xi_{rx, u, n}$, the position of the matrix in which two terms of polarized waves are arranged in the vertical direction are included as in Expression (8), $f_{rx, u, n, m}$ as a whole is a M×2M matrix.

After defining as described above, in a case where the propagation channel including the receiving antenna of the test object or the receiving antenna of the and the front end from the transmitting antenna, and the test environment that gives test signals to the tested antenna terminals or intermediate frequency signal input terminals via cables, the L×R matrix of expression representing the characteristics of the propagation channel in the frequency domain to be multiplied with the input of the subcarrier data k of the u-th receiving antenna is expressed by the following Expression (12).

$$\Omega \equiv [\zeta_{ijk}] \begin{bmatrix} \Xi_{rx,u,1} & 0 & 0 & \cdots & 0 \\ 0 & \Xi_{rx,u,2} & 0 & \cdots & 0 \\ \vdots & \vdots & \ddots & \ddots & \vdots \\ 0 & 0 & 0 & \cdots & \Xi_{rx,u,N} \end{bmatrix} \begin{bmatrix} \Psi_1 & 0 & 0 & \cdots & 0 \\ 0 & \Psi_2 & 0 & \cdots & 0 \\ \vdots & \vdots & \ddots & \ddots & \vdots \\ 0 & 0 & 0 & \cdots & \Psi_N \end{bmatrix} \quad (12)$$

$$\begin{bmatrix} \xi_{tx,1,1} & \xi_{tx,2,1} & \cdots & \xi_{tx,S,1} \\ \xi_{tx,1,2} & \xi_{tx,2,2} & \cdots & \xi_{tx,S,2} \\ \vdots & \vdots & \ddots & \vdots \\ \xi_{tx,1,N} & \xi_{tx,2,N} & \cdots & \xi_{tx,S,N} \end{bmatrix} \begin{bmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{S,1} & w_{S,1} & \cdots & w_{S,R} \end{bmatrix}$$

In the above Expression (12), the S×R matrix in which w1, 1 to wS, R are used as elements is the matrix indicating the beam forming characteristics. When simplifying the five matrixes configuring Expression (12) to represent as follows, by the arithmetic operation of four matrixes [Ξ], [Ψ], [ξ], and [w], the characteristics in the time domain of the propagation channel from the transmitting antenna to the receiving antenna is obtained. The characteristics in the frequency domain of the propagation channel to which the Rayleigh distribution characteristic is imparted are obtained by summing those which can be regarded as a common Doppler frequency and performing arithmetic operation of a matrix [ζ] for performing the Fourier transform process.

[$\zeta_{ijk}$] is a matrix of L×(N·M).
i={1, 2, . . . , L}
j={1, 2, . . . , N·M}=(Index of ray included in all clusters)
$\zeta_{ijk}$ is represented as follows.

$$\zeta_{ijk} \equiv \{\text{angle}(\hat{r}_{rx,n,m}) \approx \text{angle}(i)\} \cdot \sqrt{\frac{P_n}{M}} e^{-j2\pi\Delta f_0 k_0 \tau_{n,m}} \quad (13)$$

$$k_0 = \{-K0/2, (-K0/2)+1, \cdots, -1, 0, 1, K0/2-1\}$$

Where, {angle . . . angle(i)} of Expression (13) is the comparison result in which when quantizing the direction of seeing the m-th ray of the n-th cluster from the test target in the direction of L ways, it is "1" when it is the i th direction, and it is "0". In addition, τn, m is the propagation delay from the m-ray of the n-th cluster to the test object, Δf0 is the sample interval (a necessary and sufficient interval that it is determined that aliasing will not occur due to spreading of time domain delay) in the frequency direction of the result of the Fourier transform process for transforming the characteristics of the propagation channel into the frequency domain, and e−j2π gives a delay of τn, m in the time domain by rotating according to the frequency index k0.

In addition, in the interpolation process after the Fourier transform process, K0 is a necessary number for covering the range required for calculating the characteristic at each frequency of the number of subcarriers K/B for each band when dividing the OFDM modulation band composed of K subcarriers into B. That is, it is a number that covers a range longer by about half of the impulse response of interpolation process before and after than the number of samples of Δf0 interval corresponding to the frequency width of K/B. That is, in a case where the {n, m} direction is regarded as the i-th Doppler frequency, it means that the element corresponding to the component is rotated corresponding to the delay and added to the i-th row. Where, B is considered separating the beam forming characteristic for each band obtained by dividing the OFDM modulation band into B. In the case where common beamforming is performed for all subcarriers K, B=1 is established.

Figure 5:
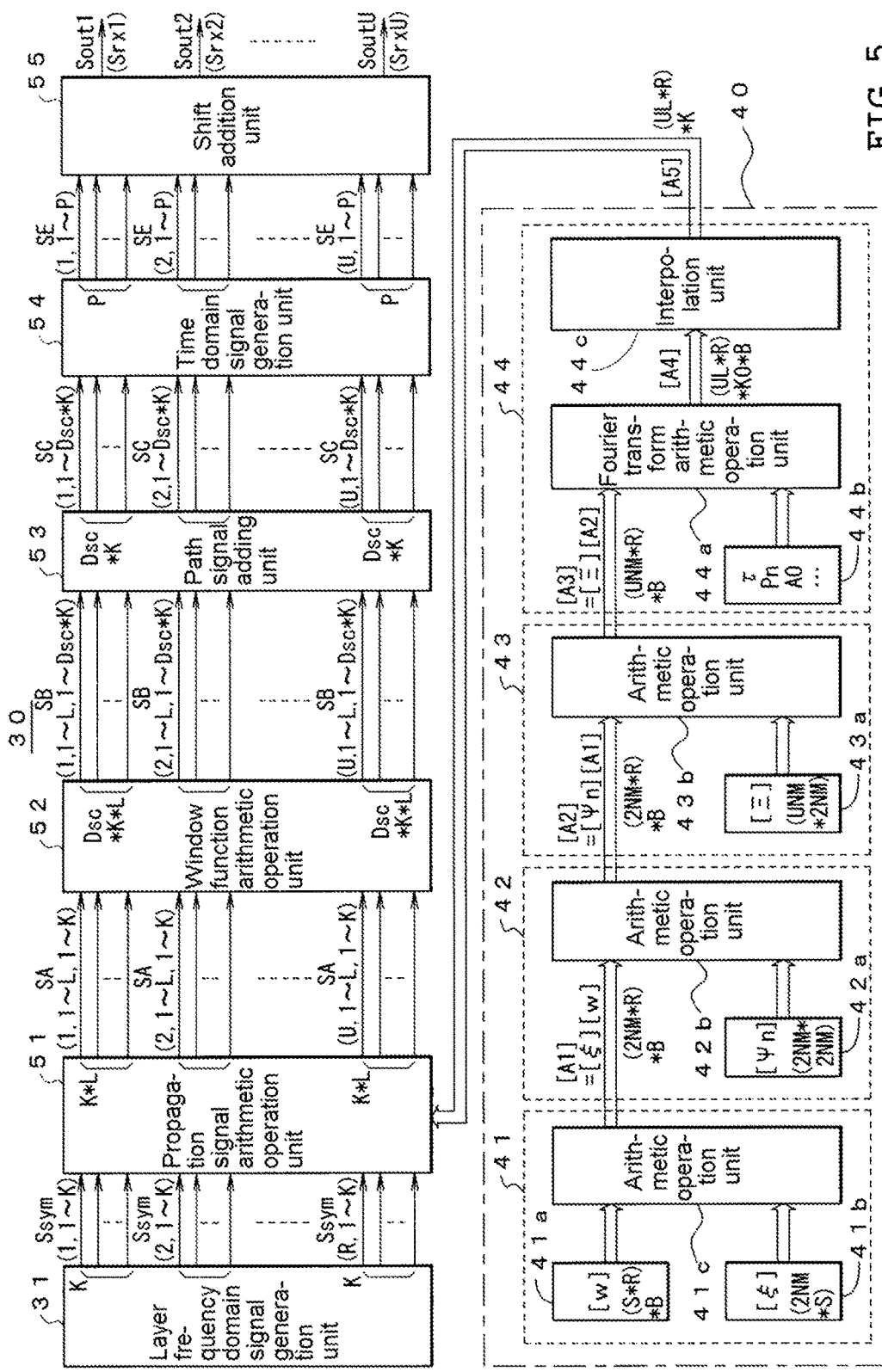
FIG. 5 is a diagram illustrating a configuration of an embodiment of the present invention.

The present invention generates a signal necessary for testing based on the above Expression (12). The embodiment will be described below. FIG. 5 illustrates the configuration of the test apparatus 30 according to the embodiment of the present invention.

The testing device 30 is a device for testing a MIMO scheme system adopting a multicarrier modulation scheme using K carriers, a MIMO scheme using the number of transmitting antennas S and the number of receiving antennas S, and a beam forming process scheme for setting radiation beam characteristics based on transmitting antennas having the number of antennas S, generates receiving signal received by the U receiving antennas through a propagation environment including N scatters transmitted from the S transmitting antennas and gives the generated receiving signal to the test object (in the propagation environment where there are N scatters between the transmitting and receiving antennas, it is assumed that M pieces of scattered M wavelets are incident on each scatter and are grouped in L), and the receiving signal received by U receiving antennas is generated via the propagation channel and given to the test object. In the following description, it is assumed that the multicarrier modulation scheme is OFDM, and in OFDM, a plurality of carriers used for communication with a terminal are called "subcarriers", so in the following description also this "subcarrier" will be described.

The testing device 30 includes a layer frequency domain signal generation section 31, a propagation channel characteristic arithmetic operation unit 40, a propagation signal arithmetic operation unit 51, a window function arithmetic operation unit 52, a path signal addition unit 53, a time domain signal generation unit 54, and a shift addition unit 55.

The layer frequency domain signal generation unit 31 generates and outputs modulation signals (constellation data) Ssym(1, 1) to Ssym(1, K), Ssym(2, 1) to Ssym(2, K), . . . , Ssym(R, 1) to Ssym(R, K) for each of K subcarriers with respect to R series of transmitting data (called layer or stream) attempted to be transmitted to a test object. This modulation signal is a signal in the frequency domain including R series of pieces of data having K pieces of constellation data lined up on a frequency axis, for each OFDM symbol. Meanwhile, the number of layers R is, in principle, a value equal to or less than the number of receiving antennas U which are test objects.

Here, the constellation data is represented by a complex number of symbols of Ssym, r, k as follows.

$$S\text{sym},r,k \tag{14}$$

sym: OFDM symbol number
r={1, 2, 3, . . . , R}: transmitting layer number index
k={1, 2, 3, . . . , K}: subcarrier number index Meanwhile, in FIG. 5, the index of a signal Ssym, r, k is represented by a form of Ssym(r, k), in order to make it easier to understand (the same is true of other signals).

In addition, an interval (subcarrier interval) at which the constellation data is disposed is set to fsc. fsc has the following relationship with an OFDM symbol length Tsym (=effective data length+cyclic prefix length).

$$\text{Effective data length}=1/fsc \tag{15}$$

$$T\text{sym}=(1/fsc)+\text{cyclic prefix length} \tag{16}$$

On the other hand, the propagation channel characteristic arithmetic operation unit 40 for obtaining the characteristics in the frequency domain for the propagation channel from the transmitting antenna through the propagation environment including the scatterer to the receiving antenna can be regarded as having the same Doppler frequency (quantization in the L type) of the radio waves arriving at each receiving antenna Rayleigh noise generation process and beam forming equalization process as a group of a plurality of possible waves are performed at time intervals of FFT units, and the first propagation channel arithmetic operation unit 41 to the third propagation channel arithmetic operation unit 43. The process of each of these operation units can be implemented as pipeline process for each time in FFT units.

In addition, the first propagation channel arithmetic operation unit 41 outputs beamforming data representing characteristics of beams radiated from a plurality of transmitting antennas for each layer, and data on the basis of transmitting antenna characteristics from the transmitting antenna, and per scatterer and propagation channel characteristic data that simulates the propagation channel until the M wavelets reach the scatterer, the characteristic that the beam forming characteristic is imparted to the propagation channel from the transmitting antenna to the scatterer is obtained. In this embodiment, the signal output from the transmitting antenna is described by distinguishing the signal into two mutually orthogonal polarization components (horizontal polarization and vertical polarization). However, it may be a single linearly polarized wave.

Specifically, as shown in FIG. 5, the first propagation channel arithmetic operation unit 41 includes a beam forming setting unit 41a, a transmitting antenna characteristic setting unit 41b, and an arithmetic operation unit 41c. The beam forming setting unit 41a divides the OFDM modulated wave band into B and sets the beam forming matrix having the number of transmitting antennas S and the number of layers R to B pairs in the consideration of the possibility that the beam forming characteristics may differ for each of the divided bands. In the case where the OFDM modulation wave band is not divided, B=1.

The data items to be set in the beam forming setting unit 41a and the transmitting antenna characteristic setting unit 41b are elements of S×R matrix [w] represented in above Expression (12) and [ξ] formed of the 2·N·M·×S matrices as a whole in which 2M×1 matrix of elements ξtx, s, m including two polarization components are arranged side by side in N×S matrix. By the matrix multiplication (multiply-add operation) of the arithmetic operation unit 41c for these matrices, data of (N·M)×R matrix for each of the two polarized components is generated B by number. This is illustrated by (2NM*R)*B in FIG. 5.

Accordingly, the number of sequences depending on the number of transmitting antennas S are eliminated in the arithmetic operation result [A1] of the first propagation path arithmetic operation unit 41 and the number of transmitting antennas is extremely large as proposed in the fifth generation (for example, 128 antennas, or the like) system, it is possible to perform subsequent arithmetic operation process in a short time with a small-scale configuration. In terms of numerical examples of elements other than the number S of transmitting antennas, the number of receiving antennas U=2, the number of layers R=2, the number of scatters N=24, the wave number M=20, and the like.

In the common transmitter, the beamforming process is performed on the transmitting data. However, as a process of the simulator including fading process, the number of operation units having S number of channels with the arithmetic operation with the propagation channel characteristic side is performed first. In other words, the amount of arithmetic operation of this portion is proportional to the number S of transmitting antennas. However, as in this embodiment, by executing the arithmetic operation between the beamforming characteristic and the propagation channel characteristic side first, S paths can be regarded as the arithmetic operation unit. This arithmetic operation process may be performed in a comparatively long time as a time interval for executing FFT, and when considering that the multiplier is used many times in time division, the number of multipliers on the implementation can be small.

The second propagation path arithmetic operation unit 42 arithmetic operates the characteristic of the propagation path to which the Doppler frequency shift caused by the movement of the test object including the receiving antenna is added to the arithmetic operation result [A1] of the first propagation path arithmetic operation unit 41. The second propagation path arithmetic operation unit 42 includes a Doppler shift characteristic setting unit 42a that provides the matrix [ψ] having the phase data that is rotated by the Doppler frequency shift as an element, and an arithmetic operation unit 42b for multiplying and accumulating the matrix [ψ] set by the Doppler shift characteristic setting unit 42a with respect to the arithmetic operation result [A1] of the first propagation channel arithmetic operation unit 41.

Here, as described above, the arithmetic operation result [A1]=[ξ][w] of the first propagation path arithmetic operation unit 41 is a B (2·N·M)×R matrix including two polarization components. As described above, since the matrix [ψ] set by the Doppler shift characteristic setting unit 42a is such that the elements Hn, m of the 2M×2M matrix are arranged in the N×N matrix, and as a whole, (2·N·M)× (2·N·M) diagonal matrix, the arithmetic operation result [A2] is a (2·N·M)×R matrix of B.

In addition, the third propagation path computing unit 43 arithmetic operates the receiving characteristics of the receiving antennas for the two polarized components with the input of the arithmetic operation result [A2] obtained by the second propagation path calculating unit 42 as the receiving antenna characteristics to obtain the characteristic of the propagation path including the receiving antenna. The third propagation path computing unit 43 includes a receiving antenna characteristic setting unit 43a for giving the matrix [Ξ] having data of receiving antenna characteristics as an element and a receiving antenna characteristic setting unit 43b for adding the arithmetic operation result [A2] of the second propagation path arithmetic operation unit 42 and an arithmetic operation unit 43b which performs multiply-add operation of matrix [Ξ] set by receiving antenna characteristics setting unit 43a.

Here, as described above, the matrix [Ξ] set by the receiving antenna characteristic setting unit 43a is such that the elements frx, u, n, m of the M×2M matrix are arranged in an N×N matrix as described above. Since there are U antennas for receiving antennas, it is a diagonal matrix of (U·N·M)×(2·N·M) as a whole, the arithmetic operation result [A3] of the matrix [E] and [A2] by the arithmetic operation unit 43b is represented by U·N·M×R matrix of B as the two polarization components are synthesized by the receiving antenna.

The characteristic [A3]=[Ξ][Ψ][ξ][w] of the propagation path obtained in this manner represents a characteristic of the propagation channel in which a desired beam forming characteristic is given from each transmitting antenna and radiated, In a state where a desired Doppler frequency shift is imparted by M paths from all N scatters, and it is a propagation channel arriving at each receiving antenna and is received.

The characteristic of the propagation path is given to the Fourier transform unit 44. The Fourier transform unit 44 follows the Rayleigh distribution by integrating the paths in which the Doppler frequency shift can be regarded as common for each receiving antenna among the characteristics of the propagation path obtained by the third propagation path arithmetic operation unit 43 as one unit and provides fading characteristics. The Fourier transform unit 44 performs the Fourier transform on the characteristics of the propagation path obtained by grouping the whole in units of L and it is converted into the characteristics of the propagation path in the frequency region for each subcarrier interval.

In order to realize this, the Fourier transform unit 44 includes the Fourier transform operation unit 44a for collectively performing Fourier transform process of items that can be regarded as a common Doppler frequency shift, coefficient setting for setting parameters used for the arithmetic operation unit 44b and the interpolation unit 44c which performs interpolation process on the arithmetic operation result of the Fourier transform operation unit 44a.

The Fourier transform computing unit 44a performs arithmetic operation process of the [ξ] on the computation result [A3] by using the parameters set in the coefficient setting unit 44b. As described above, since [A3] is a U·N·M×R matrix of B and [ξ] is an L×(N·M) matrix for each of the U receiving antennas, and the arithmetic operation result [A4] is U·L×R×K0 matrix B.

Coefficients Pn, M, τn, m, AoAn, m (Angle of Arrival: information on angular direction at which cluster m of cluster n arrives), and the like necessary for the Fourier transform process are set in the coefficient setting unit 44b in advance.

As described above, the Fourier transform unit 44 performs the Fourier transform on the Doppler frequencies (quantized to L types) when viewing the arithmetic operation result [A3] from each of the U receiving antennas, and converts the signal into a necessary and sufficient sampling interval frequency domain signal which is determined from the time spread of the propagation path (it is determined that no aliasing occurs from the delay spread in the time domain). That is, for each U antenna, rotations corresponding to delays of rays (N·M) in the time domain are given, and element waves that can be regarded as the same Doppler frequency are added, and the process result is U·L×R matrix, as K0 (K0 is the number of samples in the frequency direction). Here, by reducing L and K0, it can be compressed to realistic circuit resources. By implementing the delay as a rotation in the frequency domain, the circuit scale can be made smaller than the conventional method of delaying the IQ data directly by the "sample delay+resampling filter" which has is performed in the related art.

The interpolation unit 44c interpolates the Fourier transform result [A4] obtained by the Fourier transform arithmetic operation unit 44a in the frequency axis direction, whereby the sample interval becomes the subcarrier interval of the OFDM signal. By the interpolation process, the U·L×R×K matrix propagation path characteristic [A5] of in the frequency domain is obtained.

As described above, since the Fourier transform unit includes the Fourier transform arithmetic operation unit 44a and the interpolation unit 44c, the sampling interval in the frequency domain when implementing the Fourier transform process is set, for example, to the minimum necessary interval determined by the maximum delay amount of the propagation path characteristic in the time domain. It is possible to perform pipeline process of two stages of interpolating propagation path characteristics in the frequency domain by the interpolation unit 44c with the input of the arithmetic operation result, and the time taken for each process is extended, and by using the common circuit resource a plurality of times, thereby reducing the circuit scale in the Fourier transform. It is also possible to reduce the sampling interval in the frequency domain of the Fourier transform arithmetic operation unit 44a so as to omit the interpolation process by the interpolation unit 44c.

The propagation signal arithmetic operation unit 51 multiplies the propagation path characteristic [A5] obtained by the Fourier transform unit 44 by the modulation signal Ssym of the R×K sequence generated by the layer frequency domain signal generation unit 31 to generate the subcarrier and generates a propagation signal SAsym (u, l, k) of U×L series per one frame. Note that the propagation signal SAsym (u, l, k) and each propagation signal SBsym ( . . . ) to SEsym ( . . . ) described later are expressed as SA ( . . . ) to SE ( . . . ) in the drawings.

The window function arithmetic operation unit 52 multiplies the propagation signal SAsym (u, l, k) per U/L series per carrier generated by the propagation signal arithmetic operation unit 51 by the window function rotating at the Doppler frequency corresponding to each series. The convolution operation of the frequency characteristic of the window function is performed to extract the propagation signal SB of the U×L series per carrier.

That is, for each (UL) number of paths, an interpolation convolution operation in the frequency domain corresponding to multiplying the window function rotating with the Doppler frequency corresponding to each path in the time domain is performed. However, it is necessary for the time length of the window function to be a time length that can neglect the change in the phase relation between a plurality of rays in which the Doppler frequencies in each path can be considered to be the same. It is simplest to set the time length of the window function to be CP length of OFDM+effective data length. The process result of this arithmetic operation is U·L×K·Dsc, when Dsc is defined as the interpolation rate. By adding the Doppler frequency shift to the OFDM subcarrier data itself by the window function arithmetic operation unit 52 in this manner, the fading model can be faithfully reproduced.

Structurally, the frequency shift (resampling in the frequency domain) due to the Doppler effect of the modulated wave itself realizes frequency shift of the modulated wave signal by using a sample sampled at points shifted by the Doppler frequency as filter coefficients used in convolution in the frequency domain corresponding to multiplying the window function in the time domain.

Here, the basic process of the window function arithmetic operation unit 52 will be described. As a process equivalent to the multiplication of a window function for localization $fw_\tau$ ($\tau$ is an index in the direction of a time axis) of the section length Tc' in the time domain, a convolution process is performed on Fourier transform (Coep, i) [i is a coefficient index in a frequency direction, and p is the number of a window function in one OFDM symbol] of the window function for localization in the frequency domain.

Here, the multiplication arithmetic operation of the window function for localization of a p-th (p=1, 2, 3, . . . , P) section length Tc' obtained by P-dividing one OFDM symbol of the length Tsym is mathematized as follows. Here, a sampling interval on a post-process frequency domain is determined in accordance with a magnitude relation between (Tc'+Td) and 1/fsc (cycle in the time domain when IFFT is performed at a subcarrier interval fsc of output of the layer frequency domain signal generation unit 31).

(a) In Case of (Tc'+Td)>1/fsc
sampling interval in the frequency domain is made finer, and thus the waveform of the time length (Tc'+Td) is caused not to generate aliasing (overlap) in the time domain. That is, as shown in the following Expressions (18) and (19), an interpolation process is performed in order that the relation of (Tc'+Td)<1/(fsc/Dsc) is satisfied, and that a sampling interval in the frequency domain of a convolution processing result is set to be times 1/Dsc (process equivalent to interposing Dsc−1 zeros between original subcarriers and then performing a filtering process based on the convolution).

$$SB_{sym,p,u,l,k'} = \Sigma SAsym, u, l, [(k'-g)/Dsc+<K/2>+1]- \\ i \cdot Coe_{sym,p,u,l,Dsc \cdot i+g}, \; g = k'\% Dsc \quad (18)$$

$$Coe_{sym,p,u,l,Dsc \cdot i+g} = \text{Resample}\{sym, p, u, l, DFT \\ (fw_\tau)\} \sim e^Z \cdot \text{window}(Dsc \cdot i+g), \; Z = -j2\pi \cdot fsc \cdot (i+g/Dsc) \cdot Tc \cdot (\tfrac{1}{2}+p-1) \quad (19)$$

Symbol $\Sigma$ of Expression (18) indicates the sum of i=−TapNum/2 to TapNum/2. In addition, the spreading in the frequency domain of DFT (fwτ) is limited by a window(i), its tap length is assumed to be a window function of Dsc·(TapNum+1). DFT (fw$_\tau$) is discrete Fourier transform over a time span 1/(fsc/Dsc). Here, fw$_\tau$ is, for example, a window function as illustrated in FIG. 2 as assumed to be a waveform in which its center is located at time 0, and moves a position corresponding to p in a case where a waveform is retarded by Tc·(½+p−1).

In addition, $e^Z$ of Expression (19) is a term for giving rotation on the frequency domain equivalent to retarding a waveform by Tc·(½+p−1) in the time domain. In addition, Resample ( ) in Expression (19) resamples so that the DFT result of the window function is shifted by the Doppler frequency corresponding to (u, l), and the entire phase is shifted by the IDFT result before and after the continuous waveform (Sym, p) so as to satisfy the equation (sym, p).

In addition, in Expression (18), k' indicates a frequency index after the interpolation process.

k'={Dsc·(0−<K/2>), Dsc·(1−<K/2>), . . . , Dsc·(K−1−<K/2>)}

However, a propagation signal SAsym(u, l, k) of k={1, 2, 3, . . . K} has a corresponding relation to the position of the frequency index. Meanwhile, the angle bracket symbol <A> of Expression (18) indicates a maximum integer that does not exceed A (and so forth).

In addition, the symbol % of Expression (18) is a remainder operator, and g is the remainder when k' is divided by Dsc. However, Expression (18) is required to be calculated in the following range, and SAsym(u, l, i)=0 is set in a range of i<0 and i>K.

−Dsc·(<K/2>+TapNum/2)≤k'≤Dsc·(<K/2>+TapNum/2)

(b) In Case of (Tc'+Td)<1/fsc
As shown in the following Expressions (20) and (21), the sampling interval of a convolution processing result is subject to a convolution process so as to be unchanged from the output of the propagation signal arithmetic operation unit 51 (no interpolation).

$$SB_{sym,p,u,l,k'} = \Sigma SA_{sym,u,l,(k'+<K/2>+1)} - i \cdot Coe_{sym,p,u,l,i} \quad (20)$$

$$Coe_{sym,p,u,l,i} = \text{Resample}\{sym, p, u, l, DFT \\ (fw_\tau)\} \cdot e^{Z'} \cdot \text{window}(i), \; Z' = -j2\pi \cdot fsc \cdot i \cdot Tc \cdot (\tfrac{1}{2}+p-1) \quad (21)$$

Here, the symbol $\Sigma$ of Expression (20) indicates the sum of i=−TapNum/2 to TapNum/2. In addition, the spreading in the frequency domain of DFT (fwτ) is limited by a window (i), its tap length is assumed to be a window function of Dsc·(TapNum+1). DFT(fw$_\tau$) is discrete Fourier transform over a time span 1/(fsc/Dsc). Here, fw$_\tau$ is, for example, a window function as illustrated in FIG. 2 as assumed to be a waveform in which its center is located at time 0, and moves a position corresponding to p in a case where a waveform is retarded by Tc·(½+p−1).

In addition, $e^Z$ of Expression (21) is a term for giving rotation on the frequency domain equivalent to retarding a waveform by Tc·(½+p−1) in the time domain. In addition, Resample ( ) in Expression (20) resamples so that the DFT result of the window function is shifted by the Doppler frequency corresponding to (u, l), and the entire phase is shifted by the IDFT result before and after the continuous waveform (Sym, p) so as to satisfy the equation (sym, p).

In addition, in Expression (20), k' indicates a frequency index after the interpolation process.

k'={Dsc·(0−<K/2>), Dsc·(1−<K/2>), . . . , Dsc·(K−1−<K/2>)}

However, a propagation signal SAsym(u, l, k) of k={1, 2, 3, . . . K} has a corresponding relation to the position of the frequency index. However, Expression (20) is required to be calculated in the following range, and SAsym(u, l, i)=0 is set in a range of i<0 and i>K.

−(<K/2>+TapNum/2)≤k'≤(<K/2>+TapNum/2)

In the above description, although Doppler frequency shift is not described, as described above, in a case of the consideration of the Doppler frequency shift, as the filter coefficient to be used in the convolution in the frequency domain corresponding to multiplying the window function in the time domain, the frequency shift due to the Doppler effect of the modulated wave itself realizes the frequency shift (resampling in the frequency domain) of the modulated wave signal is realized by using the sampled points deviated by the Doppler frequency as shown by the window function frequency characteristic in FIG. 4.

The path signal adding unit 53 performs arithmetic operation for adding the signals of the L path in which applies different Doppler frequency shifts for each of the U receiving antennas by using the propagation signal SBsym (u, l, k') of the SfU×L series extracted by the window function calculating unit 52.

Figure 6:
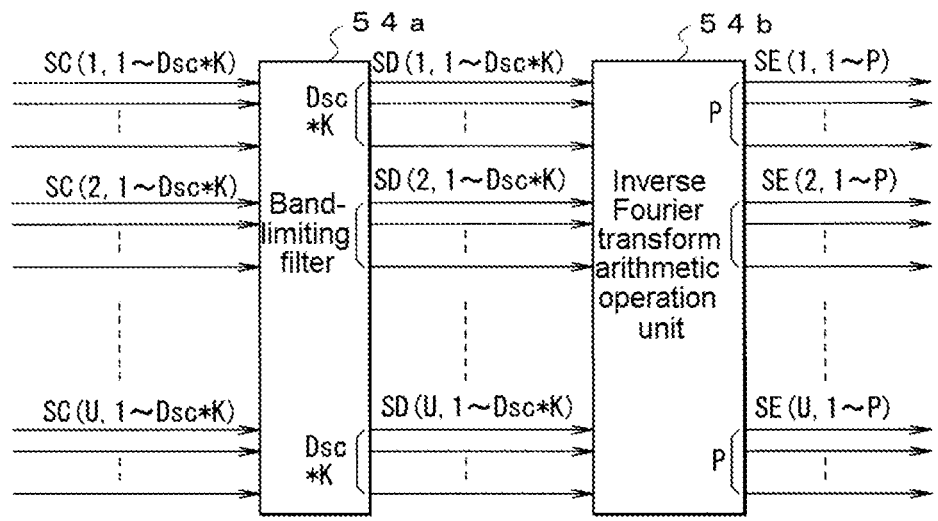
FIG. 6 is a configuration diagram of main parts of the embodiment of the present invention.

The arithmetic operation result SCsym (u, l, k') of the path signal adding unit 53 is input to the time domain signal generation unit 54. As illustrated in FIG. 6, the time domain signal generation unit 54 includes a band-limiting filter 54a and an inverse Fourier transform arithmetic operation unit 54b. The inverse Fourier transform process is performed with the input of the arithmetic operation result obtained by the path signal adding unit 53 and the receiving signal in the time domain to be given in receiving antennas.

As shown in the following Expression (22), the band-limiting filter 54a performs multiplication in the frequency domain of the characteristics (BandFilk) of the band-limiting filter with respect to the input signal SCsym (u, l, k'), and performs band limitation. Meanwhile, this band-limiting process can be omitted.

SDsym(u,p,k)=SCsym(u,l,k')·BandFilk' (22)

As shown in the following Expression (23), the inverse Fourier transform arithmetic operation unit 54b performs high-speed inverse Fourier transform IFFT with respect to the signal SDsym (u, p, k') (or output signal SCsym (u, l, k') of the path signal adding unit 53) in a band-limited frequency domain, and thus converts the signal into a signal Stsym, p, m, τ in the time domain.

SEsym(u,p)τ=IFFT{SDsym(u,p,k')} (23)

Here, τ={1, 2, 3, . . . , Nfft} is assumed to be a time index. Nfft is assumed to be the number of FFT points.

Further, in a case where k' is in the following range,

Dsc·(<K/2>+TapNum/2)<k'<Nfft−Dsc·(<K/2>+TapNum/2)

a relation of SDsym(U, p, k')=0 is established, and SDsym (u, p, k') is periodic using Nfft as a period. That is, it is assumed that a relation of SDsym (u, p, k')=SDsym (u, p, k'+i·Nfft) is established with respect to an integer i.

In the time domain signal generation unit 54, it is also possible to perform the process of the band limiting filter 54a in the time domain after the process of the inverse Fourier transform arithmetic operation unit 54b. However, in that case, it is necessary to perform a convolution arithmetic operation process on the signal in the time domain. On the other hand, if the band limiting filter 54a is provided in the preceding stage of the inverse Fourier transform arithmetic operation unit 54b as in the present embodiment, the filtering process can be completed by the multiplication process in the frequency domain, and compared with the convolution arithmetic operation process can be executed with remarkably small amount of calculation, and high-speed processing can be performed even in the case where a band limiting filter is provided.

The shift adding unit 55 shifts the received signal SEsym (u, p) in the time domain generated by the time domain signal generation unit 54 by the length of the window function and adds the received consecutive signals SEsym (u, p) to generate a receiving signal Sout. That is, the process result of Expression (23) is added while being shifted by a time Tc as shown in FIG. 1, and thus a series of consecutive received signals are obtained. By performing the process for U series in parallel, it is possible to generate consecutive received signals S out for U sequences expressed by the following Expression (24). However, in the Expression (24), fs is the sampling frequency in the time domain.

$$Sout_{u,\tau} = \sum_{sym} \sum_{p=1}^{P} SE\ sym,\ p,\ u,\ \tau - Tc \cdot fs \cdot [p - 1 + (sym - 1) \cdot P] \quad (24)$$

The testing device 30 of the embodiment performs the multiplication process of the characteristics of the propagation channel and the modulation signal in the frequency domain, performs the resample processing by the window function calculation in the frequency domain in consideration of the Doppler frequency shift in the calculation result, and generates the time domain signal from the calculation result. Therefore, as compared with a case where propagation channel characteristics are given while inverse Fourier transform is applied to a signal in the frequency domain for each transmitting antenna and the signal is converted into a signal in the time domain as in a scheme of related art, the scale of a circuit that performs inverse Fourier transform and a circuit that generates the propagation channel characteristic can be considerably reduced.

In particular, in the arithmetic operation for obtaining the characteristics of the propagation channels, since the arithmetic operation of the transmitting antenna characteristics taking account of the beam forming characteristics and the scatter is preferentially performed, in subsequent processes of the Doppler frequency shift in the arithmetic operation and of the arithmetic operation of receiving antenna characteristics, the arithmetic operation dependent on the number of transmitting antennas is eliminated. Therefore, as proposed by the next generation (fifth generation) communication method, in a case where a base station side (transmitting side) tests a system using a large number of antenna elements such as array antennas, a scale of the subsequent arithmetic operations can be remarkably reduced, and it is extremely effective.

For example, in a case of S=128, U=8, the number of layers R=2, the number of subcarriers K, inverse Fourier transform is required to be applied to a set of K signals in parallel by 128(=S) sets in order to generate a time domain signal as in a scheme of related art, but in the present embodiment, inverse Fourier transform may be applied to a set of Dsc·K signals in parallel by 2(=U) sets. Here, in a case where an interpolation rate Dsc is 1 (in a case of no interpolation), the number of times of multiplication can be reduced to U/S.

In addition, in a case of interpolation, the number of times of multiplication can be reduced to the following.

$$(S \cdot 2^{Q'} \cdot \log_2 2^{Q'})/(U \cdot 2^Q \cdot \log_2 2^Q)$$

In a case where a relation of Dsc·S<U is established, it is possible to realize the number of times of multiplication smaller than that of a circuit of related art. Herein, Q is an integer satisfying a relation of $(2^{Q-1})<K\leq 2^Q$, and Q' is an integer satisfying a relation of $(2^{Q'-1})<Dsc\cdot K\leq 2^{Q'}$.

In addition, in a case of the present embodiment, a Fourier transform process for converting fading information into the frequency domain is required, but in this Fourier transform process, the amount of delay of each path in the time domain corresponds to the rotational speed of a frequency component of each path in the frequency domain. Therefore, hardware in which a delay is given to each path by a combination of a memory and a resampling filter performed in the time domain of related art is replaced by a rotation process in Fourier transform, and the present embodiment is considerably advantageous when both the scales of hardware are compared with each other. Furthermore, the number of sequences of a signal on which a Fourier transform process is performed is reduced to R/N by performing the beam forming process before Fourier transform, and thus an increase in the scale of a circuit is slight.

Figure 7:
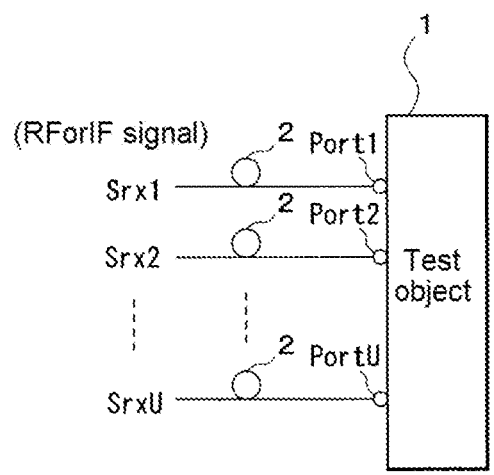
FIG. 7 is a diagram illustrating an example of a testing environment.

In the above embodiment, by assuming a propagation channel including the transmitting antenna to the receiving antenna, as illustrated in FIG. 7, U ports (Port1 to PortU) for receiving an output (RF signal) of the receiving antenna are connected via a cable 2 (RF signals) Srx1 to SrxU, respectively, to perform a first operation test of the test object 1, which is an example of a cable connection environment. However, as the actual configuration of the test apparatus 30, since it is difficult to perform the process up to the above-described shift addition in the radio frequency band of radio waves transmitted and received by the antenna, the process up to the shift addition is performed in the baseband, and the obtained base and the obtained baseband signal is converted into a signal (RF signal) of a radio frequency band by a frequency converting unit (not shown), and gives it to the test object 1 via the cable 2.

In addition, as another example of the cable connection environment, in a case where the ports Port1 to PortU of the test object 1 are ports that receive the intermediate frequency band signal (IF signal) output from the front end, as described above, the baseband signal obtained by the processing up to the shift addition is converted to a signal (IF signal) of the intermediate frequency band by a frequency converting unit (not shown), and may be given to each port Port1 to PortU via the cable 2. In this case, the characteristics of the receiving antenna can also include the frequency characteristics of the front end, and the test simulating the propagation path including the characteristics of the front end can be performed. Even in a case where the test signal is output in the radio frequency band or in the intermediate frequency band, the frequency band is shifted basically and it is basically the same, and it can be regarded as the receiving signal received by the receiving antenna.

In addition, in addition to the test of the cable connection environment as described above, for example, as illustrated in FIG. 8, in the case of a so-called over-the-air (OTA) environmental test in which a test object 1 such as a mobile terminal body having receiving antennas Arx 1 to Arx U is tested by radio waves, in the anechoic chamber 5, a test in which the test object 1 and U' probe antennas Probe 1 to Probe U' are arranged, and a radio wave is transmitted and received between the probe antennas Probe 1 to Probe U' to which the test signals Srx 1 to Srx U' are given is performed.

Figure 9:
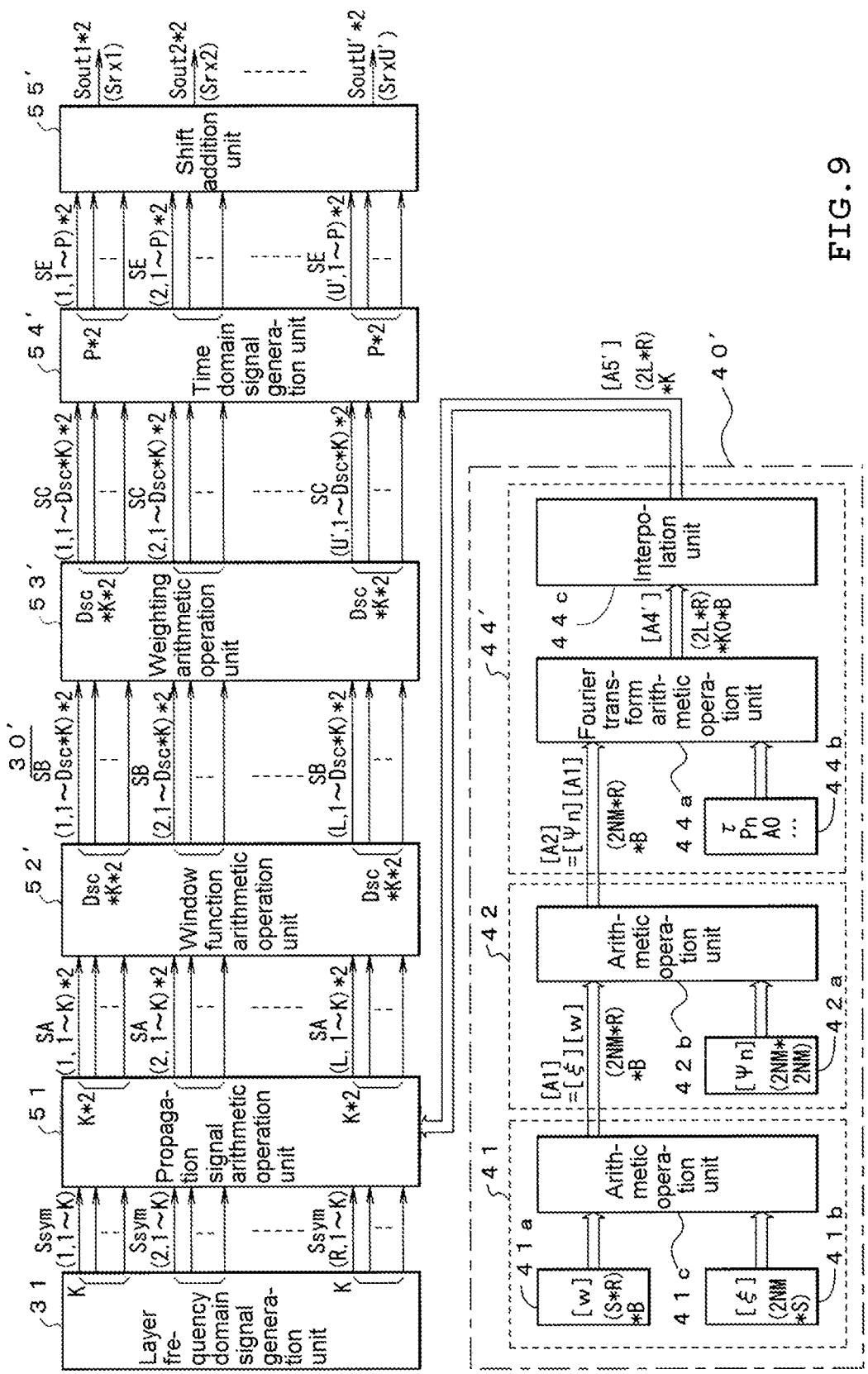
FIG. 9 is a diagram illustrating a configuration of another embodiment of the present invention.
Figure 10:
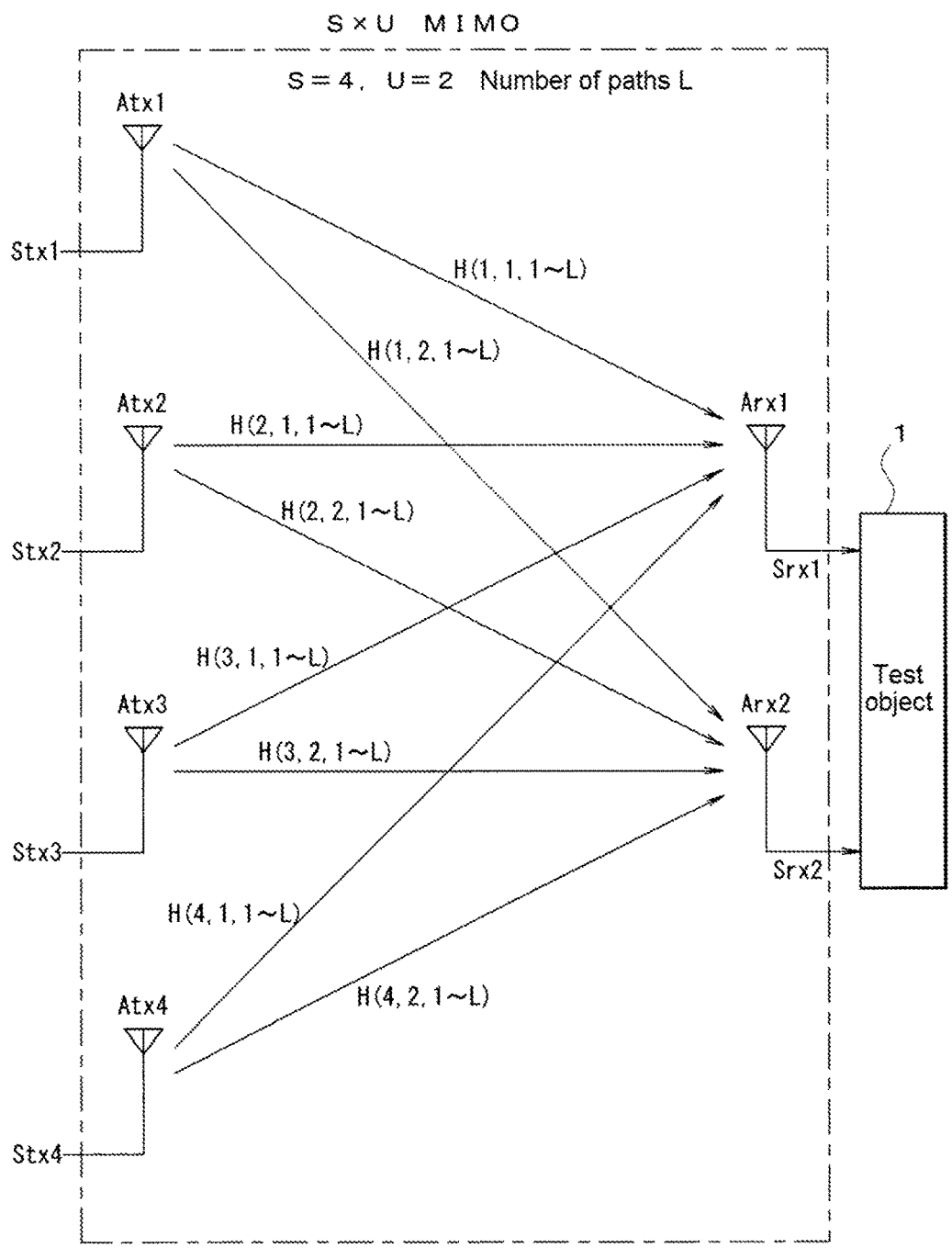
FIG. 10 is a diagram illustrating of an example of a propagation channel of multipath MIMO.
Figure 11:
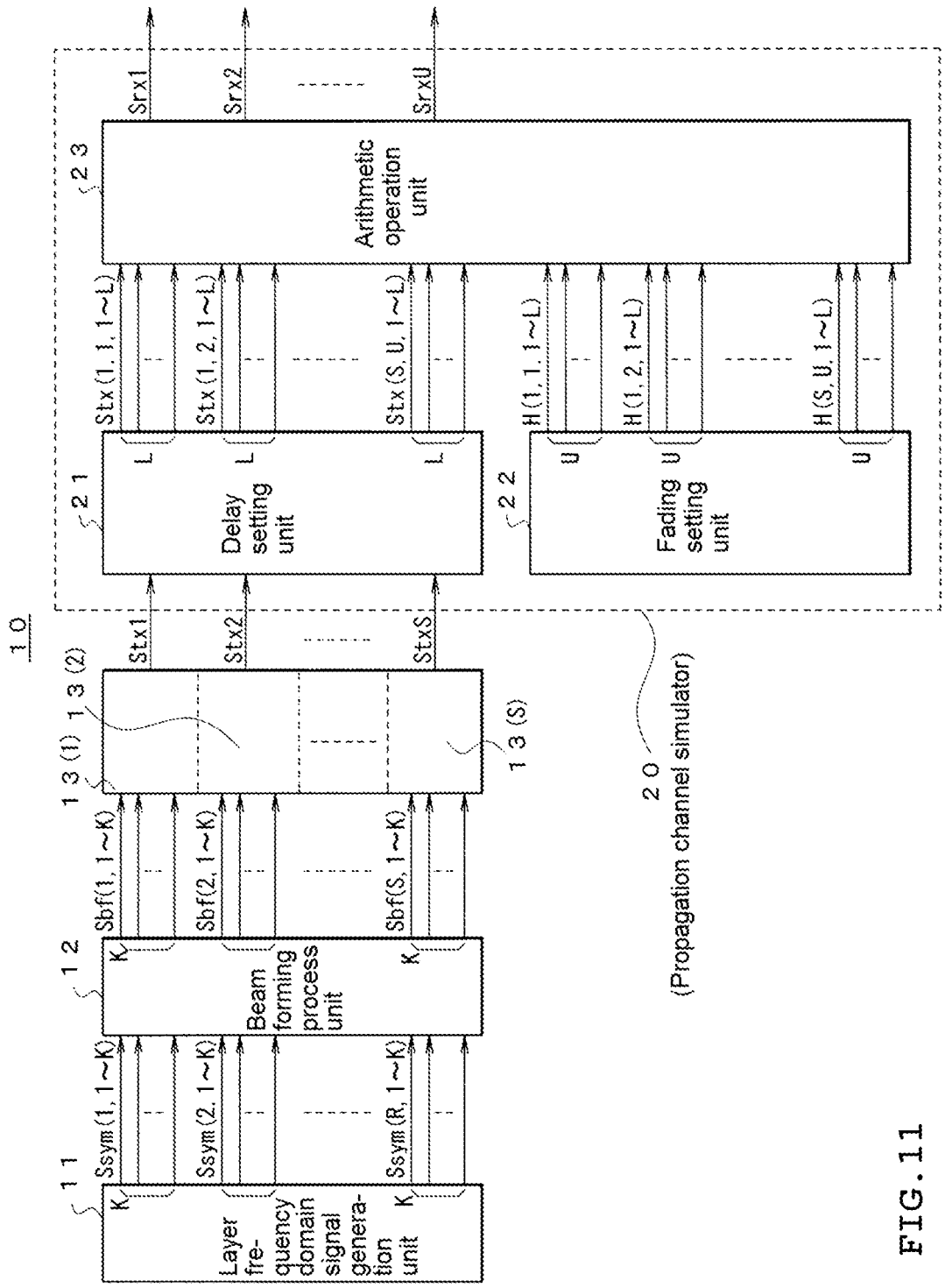
FIG. 11 is a configuration diagram of a device of related art.

In the case of such an OTA environmental test, it is possible to cope with the test apparatus 30' having the configuration shown in FIG. 9. In consideration of testing the test object including the receiving antenna, the propagation channel characteristic arithmetic operation section 40' of the testing apparatus 30' transmits the channel characteristics arithmetic operation unit 40' to the propagation channel characteristic arithmetic operation section 40' of the testing apparatus 30 of the above—The third propagation channel arithmetic operation unit 43 for imparting the receiving characteristics of the receiving antenna to the one polarization component is omitted and the weighting arithmetic operation unit 53' is used instead of the path signal addition unit 53, are basically the same as in the above embodiment.

In the configuration example, the arithmetic operation result of each of the two polarization components is included in the arithmetic operation result [A2] of the second propagation channel arithmetic operation unit 42. In the Fourier transform unit 44' directly receiving the result, it is possible to regard the arithmetic operation result [A2] of the second propagation channel arithmetic operation unit 42 as the same direction of arrival (quantization in the L direction) as seen from the test object The incident wave is collected for each of horizontal and vertical polarization planes (two planes).

That is, for each polarization plane, rotations corresponding to delays of rays (N·M) in the time domain are given, and incident waves that can be regarded as the same arrival direction are added, and the process result is 2·L×R matrix× K0 (K 0 is the number of samples in the frequency direction), and by reducing L and K0 in the same manner as described above, it can be compressed to realistic circuit resources.

In the interpolation unit 44c which receives the arithmetic operation result [A4'] of the Fourier transform arithmetic operation unit 44a of the Fourier transform unit 44', since the interpolation process in the frequency direction is performed for each of the two polarization components, the process result [A5'] is 2·L×R matrix×K. As described in the above embodiment, either of the method of performing the interpolation process by increasing the sampling interval of the Fourier transform arithmetic operation unit 44a and the method of omitting the interpolation process by reducing the sampling interval of the Fourier transform arithmetic operation unit 44a can be used. However, the former method is advantageous from the viewpoint of reducing the circuit scale.

In addition, in the arithmetic operation of the propagation signal arithmetic operation unit 51', since the matrix of the arithmetic operation result [A5'] of the Furrier transform unit 44' is multiplied by the S×R series of the modulation signal Ssym per subcarrier, the propagation signal SAsym obtained by the arithmetic operation is an L series per subcarrier for two polarized components, and the propagation signal SBsym obtained by the arithmetic operation of the window function arithmetic operation unit 52' is also L series per subcarrier (assuming the interpolation rate Dsc=1) for each of the two polarization components.

Similar to the above-described embodiment, the window function arithmetic operation unit 52' performs the interpolation convolution operation in the frequency domain. However, the time length of the window function is the time between the plurality of rays in which the directions of arrival in each path can be considered to be the same and it is necessary to set the time length to such a degree that the change in the relationship can be ignored.

In addition, the weighting arithmetic operation unit 53' weights and adds the signals of the L paths with respect to each probe antenna, that is, multiplies the signals of L arrival directions by U' with respect to the arithmetic operation result of the window function arithmetic operation unit 52' (U'×L matrix multiplication for each plane of polarization) when outputting from the OTA probe antennas (2·U' combined horizontally and vertically). Therefore, the operation result SCsym is a U' series per carrier for two polarized components.

This weighting arithmetic operation process can also be performed on the process result of the shift addition unit 55'. In general, since U'>L is established, the IFFT number decreases in that case. However, since the multiplication time that can be used to perform the matrix arithmetic operation is the sample interval in the time domain, it may be implemented with the effect that is advantageous in terms of the balance between the effect that the number of multipliers required for matrix multiplication increases due to resource usage and time reduction and the effect of reducing IFFT number. In addition, the weighting arithmetic operation process can be performed in an analog manner at the end without performing digital process.

Furthermore, the arithmetic operation result SEsym of the time domain signal generator 54' and the arithmetic operation result Sout of the shift adding unit 55' also become U' series for the two polarized components, respectively.

Figure 8:
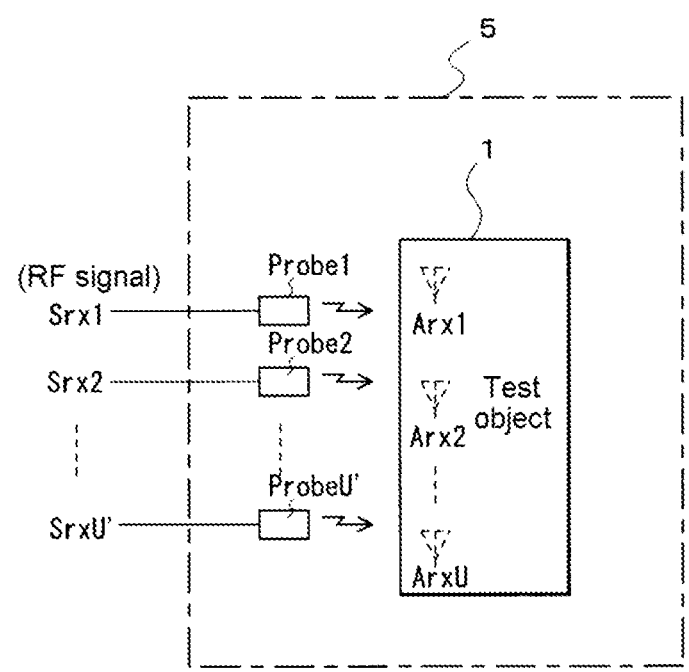
FIG. 8 is a diagram illustrating another example of the testing environment.

In the case of the test apparatus 30' of the present embodiment, the U' series of the incident wave for the two polarized components generated by the shift adding section 55' is converted into the analog frequency band used in actual wireless communication, and as illustrated in FIG. 8, in the anechoic chamber 5, two polarization components are transmitted to the test object 1 having the receiving antenna such as the main body of the mobile terminal via the probe antennas Probe1 to ProbeU' used for the OTA environment test and the test will be performed.

In the case of the test apparatus 30', similarly to the above-described embodiment, the multiplication process of the characteristics of the propagation channel and the modulation signal is performed in the frequency domain, the resampling process is performed by the window function arithmetic operation in the frequency domain taking account of the frequency shift to the arithmetic operation result, and the time domain signal is generated from the arithmetic operation result, it is possible to markedly reduce the scale of the circuit performing the inverse Fourier transform and the circuit generating the propagation channel characteristics, as compared with the case of imparting the propagation channel characteristics.

In particular, in the arithmetic operation for obtaining the characteristic of the propagation channel, the arithmetic operation of the beam forming characteristic and the transmitting antenna characteristic taking account of the scatterer is preferentially performed. Therefore, since in the arithmetic operation process which gives the subsequent Doppler frequency shift and the Rayleigh distribution, there is no the arithmetic operation process dependent on the number of transmitting antennas, in a case where the base station side (transmitting side) uses a large number of antennas such as array antennas as proposed in the next generation (fifth generation) communication method When testing the system, the scale of the subsequent arithmetic process can be drastically reduced, and it is extremely effective.

In the above embodiment, two orthogonal polarization components are included in the radio wave emitted from the transmitting antenna, but the radio wave emitted from the transmitting antenna may be a single linear polarization component. In this case, the arithmetic operation of each propagation channel arithmetic operation unit may be performed on a single linearly polarized wave component.

In addition, the above description has been given in a case where the multicarrier modulation scheme is OFDM, but the present invention can be similarly applied to a MIMO system using UFMC, GFDM, FBMC and the like which are other multicarrier modulation schemes.

Particularly, in a 3D-MIMO/Massive-MIMO expected to be used in the fourth-generation Evolution and the fifth-generation cellular phone scheme, the number of transmitting antennas of a base station is predominantly larger than the number of receiving antennas of a mobile terminal, and thus the present invention is considerably effective.

DESCRIPTION OF REFERENCE NUMERALS AND SIGNS

1: test object
30, 30' testing device of MIMO scheme system layer frequency domain signal generation unit
40, 40' propagation channel characteristic arithmetic operation unit
41 first propagation channel arithmetic operation unit
42 second propagation channel arithmetic operation unit
43 third propagation channel arithmetic operation unit
44, 44' Fourier transform unit
51, 51' propagation signal arithmetic operation unit
52, 52' window function arithmetic operation unit
53 path signal adding unit
53' weighing arithmetic operation unit
54, 54' time domain signal generation unit
54a band-limiting filter
54b inverse Fourier transform unit
55, 55' shift addition unit

What is claimed is:

1. A device for testing a multi input multi output ("MIMO") scheme system adopting a multicarrier modulation scheme using K carriers, a MIMO scheme using S transmitting antennas and U receiving antennas, and a beam forming process scheme for setting radiation beam characteristics based on S transmitting antennas, in which receiving signal received by the U receiving antennas through a propagation environment including N scatters transmitted from the S transmitting antennas is generated and the generated receiving signal is given to a test object, the device comprising:
  a layer frequency domain signal generation circuit that generates R×K series of modulation signals in a frequency domain for each of the K carriers with an input of R layers' worth of data signal sequences to be transmitted to the test object;
  a first propagation channel arithmetic operation circuit that obtains characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a second propagation channel arithmetic operation circuit that obtains characteristics of a propagation channel taking account of a movement of the test object by multiplications of an arithmetic operation result of the first propagation channel arithmetic operation circuit and phase characteristics for giving a Doppler frequency shift due to the movement of the receiving antenna and the test object;

a third propagation channel arithmetic operation circuit that obtains characteristics of a propagation channel taking account of receiving characteristics of the receiving antennas by multiplications of arithmetic operation results of the second propagation channel arithmetic operation circuit and receiving antenna characteristics indicating the receiving characteristics of the receiving antenna;

a Fourier transform circuit that groups the rays into one unit that may be regarded as having a common Doppler frequency shift for each of the receiving antennas among arithmetic operation results of the third propagation channel arithmetic operation circuit and performs Fourier transform processes on characteristics of propagation channels of L units with different Doppler frequencies to obtain characteristics of propagation channel in the frequency domain at every carrier frequency;

a propagation signal arithmetic operation circuit that generates U×L series of propagation signals per carrier in the frequency domain via a pseudo propagation channel from the plurality of transmitting antennas to the plurality of receiving antennas by multiplications of the arithmetic operation result of the Fourier transform circuit and the modulation signal of the R×K series generated by the layer frequency domain signal generation circuit;

a window function arithmetic operation circuit that, as a process in the frequency domain corresponding to the signal extraction by multiplications of a window function rotating at a Doppler frequency corresponding to each series, performs an extraction process of propagation signals of U×L series per carrier, by performing a convolution arithmetic operation of the frequency characteristic of the window function with the propagation signal of the U×L series per carrier obtained by the propagation signal arithmetic operation circuit;

a path signal addition circuit that generates U series propagation signals per carrier by performing an addition process of L units of signals for each of the receiving antennas for the arithmetic operation results of the window function arithmetic operation circuit;

a time domain signal generation circuit that generates signals in the time domain to be received by the receiving antennas by performing inverse Fourier transform processes with the input of the arithmetic operation results of the path signal addition circuit; and a shift addition circuit that generates consecutive signals to be received by the receiving antennas by shifting as much as a length of the window function and adding the signals in the time domain generated by the time domain signal generation circuit.

2. A device for testing a multi input multi output ("MIMO") scheme system adopting a multicarrier modulation scheme using K carriers, a MIMO scheme using S transmitting antennas and U receiving antennas, and a beam forming process scheme for setting radiation beam characteristics based on the S transmitting antennas, in which assumption of a pseudo propagation channel that spans the range from the S transmitting antennas to the U test object receiving antennas through a propagation environment including N scatters is made, and generating incident waves to be fed into the U receiving antennas through the propagation channel and giving the incident waves to the test object through U' probe antennas in an anechoic chamber, the device comprising:

a layer frequency domain signal generation circuit that generates R×K series' worth of modulation signals in the frequency domain for each K carriers with an input of R layers' worth of data signal sequences to be transmitted to the test object;

a first propagation channel arithmetic operation circuit that obtains characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a second propagation channel arithmetic operation circuit that obtains characteristics of a propagation channel taking account of a movement of the test object by multiplications of an arithmetic operation result of the first propagation channel arithmetic operation circuit and phase characteristics for giving a Doppler frequency shift due to the movement of the test object;

a Fourier transform circuit that groups the rays into one unit that may be regarded as having the same arrival direction of radio waves viewed from the test object among the arithmetic operation results of the second propagation channel arithmetic operation circuit and performs Fourier transform processes on characteristics of propagation channels of L units with different arrival directions to obtain characteristics of propagation channel in the frequency domain at every carrier frequency;

a propagation signal arithmetic operation circuit that generates L series of propagation signals per carrier in the frequency domain via a pseudo propagation channel from the plurality of transmitting antennas to incident channels of the plurality of receiving antennas of the test object by multiplications of the arithmetic operation result of the Fourier transform circuit and the modulation signal of the R×K series generated by the layer frequency domain signal generation circuit;

a window function arithmetic operation circuit that, as a process in the frequency domain corresponding to the signal extraction by multiplications of a window function rotating at a Doppler frequency corresponding to each series, performs an extraction process of L series of propagation signals per carrier, by performing a convolution arithmetic operation of the frequency characteristic of the window function to the propagation signal of the L series per carrier obtained by the propagation signal arithmetic operation circuit;

a weighting arithmetic operation circuit that generates U' series of propagation signals per carrier by a weighting and combining process of signals of L units for each of the probe antennas with the input of the arithmetic operation results of the window function arithmetic operation circuit;

a time domain signal generation circuit that generates signals in the time domain for outputting from the probe antennas by performing inverse Fourier transform processes with the input of the arithmetic operation results of the weighting arithmetic operation circuit; and a shift addition circuit that generates consecutive incident waves to be output from the probe antennas and to be radiated on the test object by shifting as much as a length of the window function and adding the signals in the time domain generated by the time domain signal generation circuit.

3. The device for testing the MIMO scheme system according to claim 1,
wherein the Fourier transform circuit includes
a Fourier transform arithmetic operation circuit that performs Fourier transform arithmetic operation processes with the input of the L unit' worth of the propagation channel characteristics, and
an interpolation circuit that performs interpolation processes in the frequency axis with the input of arithmetic operation results of the Fourier transform arithmetic operation circuit.

4. The device for testing the MIMO scheme system according to claim 2,
wherein the Fourier transform circuit includes
a Fourier transform arithmetic operation circuit that performs Fourier transform arithmetic operation processes with the input of the L unit' worth of the propagation channel characteristics, and
an interpolation circuit that performs interpolation processes in the frequency axis with the input of arithmetic operation results of the Fourier transform arithmetic operation circuit.

5. A method for testing a multi input multi output ("MIMO") scheme system, in a system adopting a multicarrier modulation scheme using K carriers, a MIMO scheme using S transmitting antennas and U receiving antennas, and a beam forming process scheme for setting radiation beam characteristics based on S transmitting antennas, in which assumption of a pseudo propagation channel that spans the range from S transmitting antennas to U receiving antennas of the test object through a propagation environment including N scatters is made, and generating receiving signals to be received through the U receiving antennas through the propagation channel and giving the receiving signals to the test object, the method comprising:

a step of generating R×K series of modulation signals in the frequency domain for each of the K carriers with an input of R layers' worth of data signal sequences to be transmitted to the test object;

a step of obtaining characteristics of a propagation channel taking account of beam forming characteristics, by multiplications of S×R series of beam forming characteristics, whose size is specified by the number of transmitting antennas and the number of layers, and characteristics simulating a propagation channel through which a signal transmitted from the transmitting antenna is output as M rays per scatter according to the characteristics of the transmitting antenna and arrives at the corresponding scatter;

a step of obtaining characteristics of a propagation channel taking account of a movement of the test object by multiplications of the characteristics of the propagation channel taking account of beam forming characteristics and phase characteristics for giving a Doppler frequency shift due to the movement of the receiving antenna and the test object;

a step of obtaining characteristics of a propagation channel taking account of receiving characteristics of the receiving antennas by multiplications of the characteristics of the propagation channel taking account of the movement of the test object and the receiving antenna characteristics indicating the receiving characteristics of the receiving antennas;

a step of grouping the rays into one unit that may be regarded as having a common Doppler frequency shift for each of the receiving antennas among arithmetic operation results of the characteristics of the propagation channel taking account of receiving characteristics of the receiving antennas and performing Fourier transform processes on characteristics of propagation channels of L units with different Doppler frequencies to obtain characteristics of propagation channel in the frequency domain at every carrier frequency;

a step of generating U×L series of propagation signals per carrier in the frequency domain passing through a pseudo propagation channel from the transmitting antennas to the receiving antennas by multiplications of the characteristics of the propagation channel in the frequency domain at every carrier frequency and a generated R×K' series worth of modulated signals;

a step of generating an extraction process of U×L series of propagation signals per carrier by performing a convolution arithmetic operation of the frequency characteristic of the window function with the propagation signal of the U×L series per carrier generated in the frequency domain, as a process in the frequency domain corresponding to the signal extraction obtained by multiplications of a window function rotating at a Doppler frequency corresponding to each series;

a step of generating U series of propagation signals per carrier by performing an addition process of L units of signals for each of the receiving antennas with the input of U×L series of the propagation signal per carrier extracted by the convolution arithmetic operation of the frequency characteristics of the window function;

a step of generating signals in the time domain to be received by the receiving antennas by performing inverse Fourier transform processes with the input of the U series of the propagation signal per carrier generated by the addition process; and a step of generating consecutive signals to be received by the receiving antennas by shifting as much as a length of the window function and adding the signals generated in the time domain.

6. A method for testing a multi input multi output ("MIMO") scheme system adopting a multicarrier modulation scheme using K carriers, a MIMO scheme using S transmitting antennas and U receiving antennas, and a beam forming process scheme for setting radiation beam characteristics based on the S transmitting antennas, in which assumption of a pseudo propagation channel that spans the range from S transmitting antennas to the U test object receiving antennas through a propagation environment including N scatters is made, and generating incident waves to be fed into the U receiving antennas through the propagation channel and giving the incident waves to the test object through U' probe antennas in an anechoic chamber, the method comprising:

a step of generating R×K series of modulation signals in the frequency domain for each of the K carriers with an input of R layers' worth of data signal sequences to be transmitted to the test object;

a step of obtaining characteristics of a propagation channel taking account of beam forming characteristics, by multiplications of S×R series of beam forming characteristics, whose size is specified by number of the transmitting antennas and the number of layers, and characteristics simulating a propagation channel through which a signal transmitted from the transmitting antenna is output as M rays per scatter according to the characteristics of the transmitting antenna and arrives at the corresponding scatter;

a step of obtaining characteristics of a propagation channel taking account of a movement of the test object by multiplications of the characteristics of the propagation channel taking account of beam forming characteristics and phase characteristics for giving a Doppler frequency shift due to the movement of the test object;

a step of grouping the rays into one unit that may be regarded as having the same arrival direction of radio waves viewed from the test object among the characteristics of the propagation channel taking account of a movement of the test object and performing Fourier transform processes on characteristics of propagation channels of L units with different arrival directions to obtain characteristics of propagation channel in the frequency domain at every carrier frequency;

a step of generating L series of propagation signals per carrier in the frequency domain via a pseudo propagation channel from the plurality of transmitting antennas to incident channels of the plurality of receiving antennas of the test object by multiplications of the characteristics of the propagation channel in the frequency domain at every carrier frequency and the generated R×K series modulation signals;

a step of performing an extraction process of L series of propagation signals per carrier by performing a convolution arithmetic operation of the frequency characteristic of the window function with the propagation signal of the L series per carrier, as a process in the frequency domain corresponding to the signal extraction by multiplications of a window function rotating at a Doppler frequency corresponding to each series;

a step of generating U' series of propagation signals per carrier by weighting and combining process of signals of L units for each of the probe antennas with the input of the propagation signals extracted by the convolution arithmetic operation of the frequency characteristics of the window function;

a step of generating signals in the time domain for outputting from the probe antennas by performing inverse Fourier transform processes with the input of the arithmetic operation results of the weighting process; and a step of generating consecutive incident waves to be output from the probe antennas and to be radiated on the test object by shifting as much as a length of the window function and adding the generated signals in the time domain.

7. The method for testing the MIMO scheme system according to claim 5,
wherein the step of obtaining the characteristics of the propagation channel in the frequency domain at every carrier frequency includes a step of performing Fourier transform arithmetic operation processes with the input of the L unit' worth of the propagation channel characteristics, and a step of performing interpolation processes in the frequency axis with the input of arithmetic operation results of the Fourier transform arithmetic operation process.

8. The method for testing the MIMO scheme system according to claim 6,
wherein the step of obtaining the characteristics of the propagation channel in the frequency domain at every carrier frequency includes a step of performing Fourier transform arithmetic operation processes with the input of the L unit' worth of the propagation channel characteristics, and a step of performing interpolation processes in the frequency axis with the input of arithmetic operation results of the Fourier transform arithmetic operation process.

* * * * *